(12) United States Patent
Gunawardena et al.

(10) Patent No.: US 6,866,417 B2
(45) Date of Patent: Mar. 15, 2005

(54) AUTOMATICALLY MEASURING THE TEMPERATURE OF FOOD

(75) Inventors: Ramesh Gunawardena, Chagrin Falls, OH (US); Corneel Constant Wijts, Sammamish, WA (US); John E. Arnold, Norwalk, OH (US); Norman A. Rudy, Snohomish, WA (US)

(73) Assignee: FMC Technologies, Inc., Sandusky, OH (US)

( * ) Notice: Subject to any disclaimer, the term of this patent is extended or adjusted under 35 U.S.C. 154(b) by 0 days.

(21) Appl. No.: 10/213,356

(22) Filed: Aug. 5, 2002

(65) Prior Publication Data

US 2004/0022298 A1 Feb. 5, 2004

(51) Int. Cl.[7] .......................... G01K 1/00; G01K 13/04
(52) U.S. Cl. ...................... 374/141; 374/153; 374/121; 374/124; 374/5; 414/1
(58) Field of Search .................. 374/141, 45, 142, 374/153, 120, 121, 124, 132, 208, 100, 154, 4–5; 901/40, 46; 250/341.4, 341.8, 363.02, 433; 702/121, 130

(56) References Cited

U.S. PATENT DOCUMENTS

| | | | |
|---|---|---|---|
| 2,136,055 A | * 11/1938 | Miller | 374/180 |
| 2,548,524 A | 4/1951 | Eckhoff | |
| 4,554,437 A | 11/1985 | Wagner et al. | |
| 4,717,572 A | 1/1988 | Buller-Colthurst | |
| 4,745,762 A | 5/1988 | Taylor | |
| 4,762,354 A | * 8/1988 | Gfeller et al. | 294/2 |
| 4,788,427 A | * 11/1988 | LeRoy | 250/330 |
| 4,946,025 A | * 8/1990 | Murphy | 198/459.1 |
| 5,197,375 A | 3/1993 | Rosenbrock et al. | |
| 5,318,254 A | * 6/1994 | Shaw et al. | 244/134 C |
| 5,504,345 A | * 4/1996 | Bartunek et al. | 250/559.4 |
| 5,558,234 A | 9/1996 | Mobley | |
| 5,582,663 A | * 12/1996 | Matsunaga | 156/64 |
| 5,821,503 A | 10/1998 | Witt | |
| 6,000,844 A | * 12/1999 | Cramer et al. | 374/5 |
| 6,013,915 A | * 1/2000 | Watkins | 250/341.1 |
| RE36,941 E | 11/2000 | Wolfe et al. | |
| 6,278,906 B1 | * 8/2001 | Piepmeier et al. | 700/250 |
| 6,384,421 B1 | * 5/2002 | Gochar, Jr. | 250/559.46 |
| 6,410,872 B2 | * 6/2002 | Campbell et al. | 209/577 |
| 6,437,333 B1 | * 8/2002 | Suhara et al. | 250/341.1 |
| 6,461,035 B2 | * 10/2002 | Meinlschmidt et al. | 374/5 |
| 6,779,919 B1 | * 8/2004 | Staniforth et al. | 374/147 |
| 2002/0130654 A1 | * 9/2002 | Tauchi et al. | 324/158.1 |
| 2003/0085582 A1 | * 5/2003 | Woodruff et al. | 294/103.1 |

FOREIGN PATENT DOCUMENTS

JP 61058251 A * 3/1986 ............ H01L/21/68

\* cited by examiner

*Primary Examiner*—Gail Verbitsky
(74) *Attorney, Agent, or Firm*—Christensen O'Connor Johnson Kindness PLLC

(57) ABSTRACT

An apparatus for measuring the temperature of workpieces transported on a conveyor is disclosed. In one broad aspect of the invention, the apparatus includes a translatable assembly which has a pick-up tool for picking up workpieces and a temperature-sensing device which is in proximity to the pick-up tool for measuring the temperature of the workpiece. Other embodiments are disclosed, including eliminating the pick-up tool, provided the temperature sensing device travels with the workpiece. Scanners can be utilized to designate the largest of the workpieces to be measured or for detecting overlapping workpieces. Feedback temperature control is achieved by varying a parameter, such as conveyor speed or a heat engine temperature. Also, a modeling module can be incorporated to assist with temperature control of the workpieces.

74 Claims, 10 Drawing Sheets

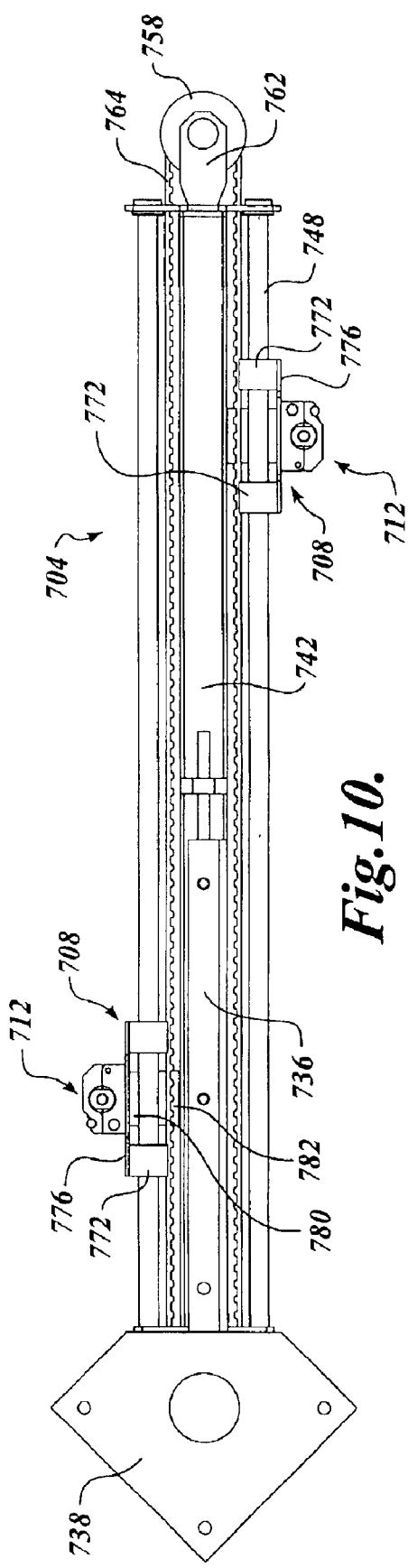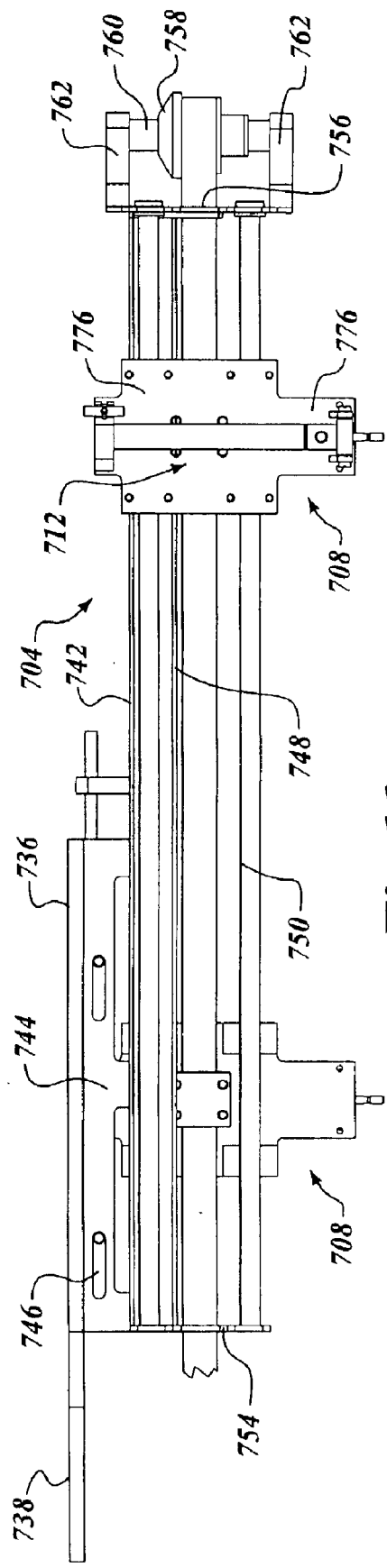

AUTOMATICALLY MEASURING THE TEMPERATURE OF FOOD

FIELD OF THE INVENTION

The present invention is directed to a system for measuring the temperature of workpieces traveling on conveyors.

BACKGROUND OF THE INVENTION

The demand for fully cooked meat and poultry items continues to increase with the ever-increasing consumer need for convenience. It is important that food processors deliver food items to the market that are safe to consume. One parameter that significantly ensures that the food items are free of pathogens is to process them to a predetermined temperature. Sometimes the cook temperatures are mandated by regulations. For example, in the United States, the U.S.D.A. prescribes the legal minimum temperatures for the major food categories. Food processors attempt to carry out these prescribed legal guidelines, however, in most situations, the food items are overcooked above the legal minimum temperature to ensure that the delivered food items are safe. Consequently, significant additional processing costs are incurred by over cooking, which are passed down to the consumer in the form of higher prices.

Presently, operators manually measure the temperature of food items being processed with hand-held digital thermometers. These measurements are taken for only a few food items at somewhat regular intervals. The measurements are used to manually make adjustments to the cooking or other process. Even among skilled personnel, the measurement and control of temperature is an art. There is a high turnover of personnel in these plants, making it extremely difficult to have an adequately trained staff on a permanent basis. This can produce considerable variation in measurements, resulting inevitably in inconsistent results for the various batches of food items being processed.

An important concern when measuring the temperature of food items is that every item be exposed to the required minimum temperature. One cannot be certain that the items that are not measured are, in fact, within the prescribed legal guidelines. This is particularly true for irregular-shaped food items having variation in size, including thickness.

Product recalls can be traced to under-processed food items. Some recalls suggest product overlapping as one condition that leads to the under-processing of food items. Overlapping occurs as a result of the food processor's strong desire to maximize belt loading. When overlapping is present, the interface between the portions of food, such as meat, acts as additional resistance to heat transfer which, under some circumstances, behaves as an insulator. Consequently, the meat or other food trapped underneath this thermal barrier can see significantly lower temperatures.

Accordingly, there is a need for developing systems and methods that can improve the consistency with which food items are thermally processed by providing for the automated measurement of the temperature of food items. Additionally, the problems of overlapping and needless over-processing are addressed with apparatus and methods of the present invention, achieving a higher confidence that no food items pass under-processed.

SUMMARY OF THE INVENTION

An apparatus for measuring the temperature of workpieces transported on a conveyor is disclosed. In one broad embodiment of the invention, an apparatus includes a translatable assembly which has a pick-up tool for picking up workpieces and a temperature-sensing device which is in proximity to the pick-up tool for measuring the temperature of the workpiece. The pick-up tool is configured to actuate in a repetitive motion.

In another embodiment, the pick-up tool is eliminated. However, the temperature-sensing device is enabled to travel with the workpiece at or about the speed of the conveyor.

In another embodiment, a system is disclosed which includes a conveyor for transporting workpieces, a heat engine for processing workpieces, a translatable assembly having a pick-up tool for picking up workpieces and a temperature-sensing device for measuring the temperature of the workpiece, wherein the heat engine is located ahead of the assembly.

In another embodiment, a scanner can be located ahead of the heat engine, wherein the scanner determines whether there is overlapping of workpieces and then signals for corrective action to be taken.

In another embodiment, a scanner is located ahead of the assembly and after the heat engine. The scanner, in this embodiment, is able to determine the largest of the workpieces in a given population. The largest of the workpieces is then selected for temperature measurement.

In another embodiment, the temperature-sensing device provides feedback control to adjust a conveyor speed controller or a heat engine controller to control the temperature of workpieces leaving the heat engine.

In another embodiment, a plurality of temperature probes are used in a temperature-sensing device to provide the high temperature, the low temperature, and the average temperature. One of the high, low, and average temperature is used in a modeling module to provide for control of the heat engine or conveyor while the actual temperature measurement of the workpiece is in progress. In this manner, the variations between measurements of different workpieces are reduced.

The apparatus according to the invention has numerous advantages. The apparatus automatically measures the temperature of a workpiece. The apparatus helps to ensure that all of the workpieces being processed by a heat engine meet the required minimum or maximum temperatures desired. The apparatus also helps to minimize overcompensating for temperature, thus realizing substantial savings in terms of energy. The apparatus also helps to minimize error introduced by human intervention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 10 shows a top view illustration of an embodiment of an off-loader portion according to the present invention;

FIG. 11 shows a side view illustration of an embodiment of an off-loader portion according to the present invention.

DETAILED DESCRIPTION OF THE PREFERRED EMBODIMENT

1. General

Figure 1:
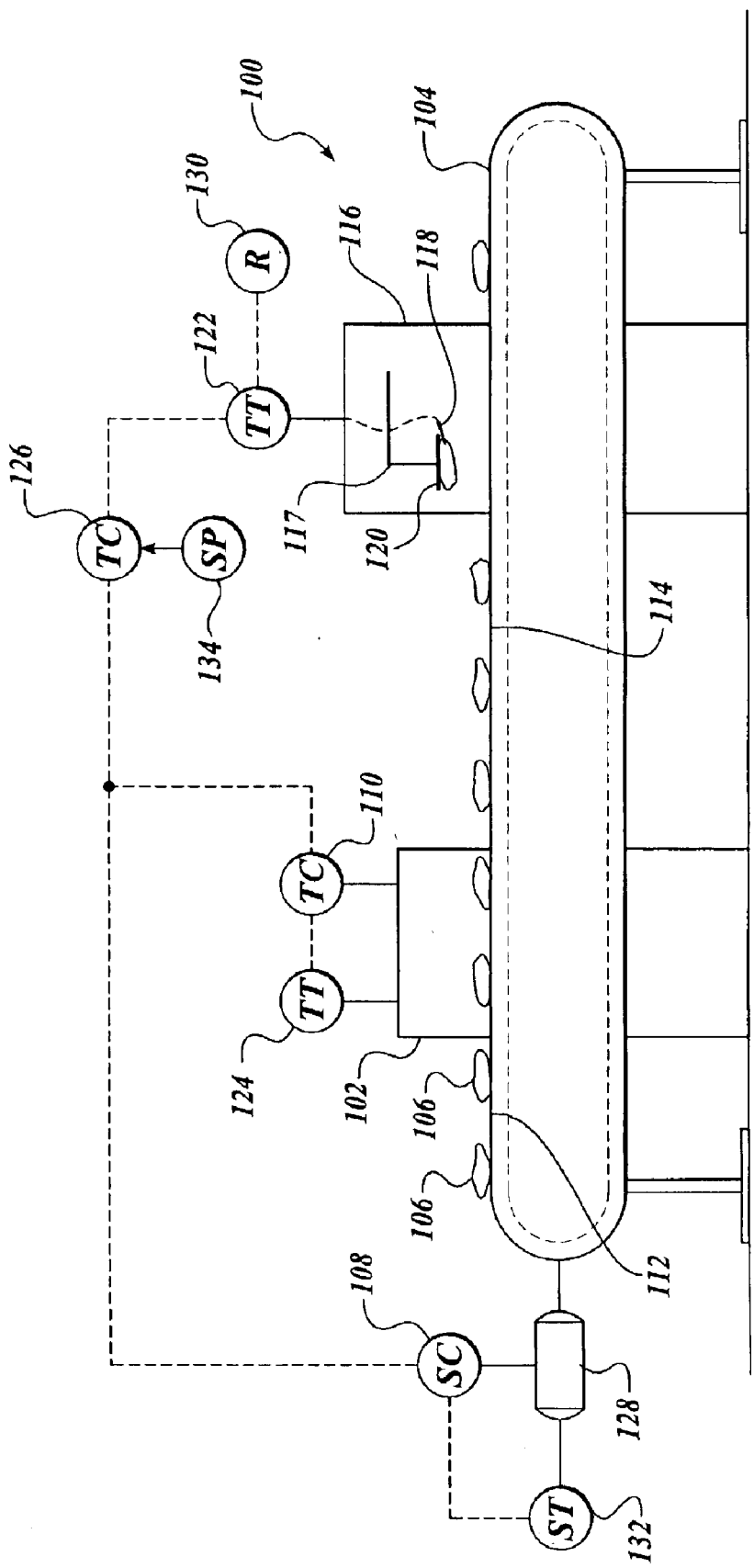
FIG. 1 shows a schematic illustration of an embodiment of a system for processing food items according to the present invention.
Figure 2:
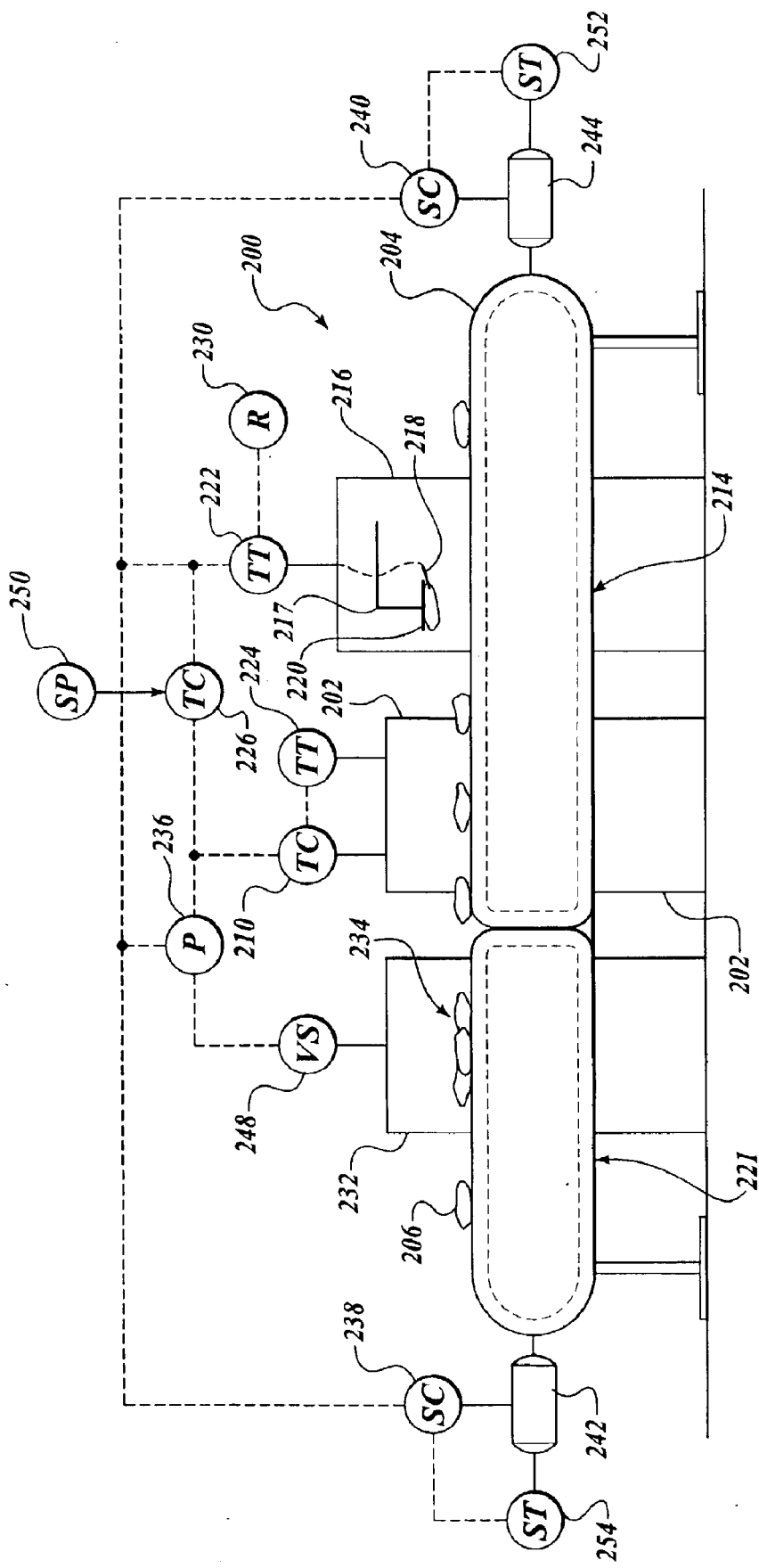
FIG. 2 shows a schematic illustration of an embodiment of a system for processing food items according to the present invention.
Figure 3:
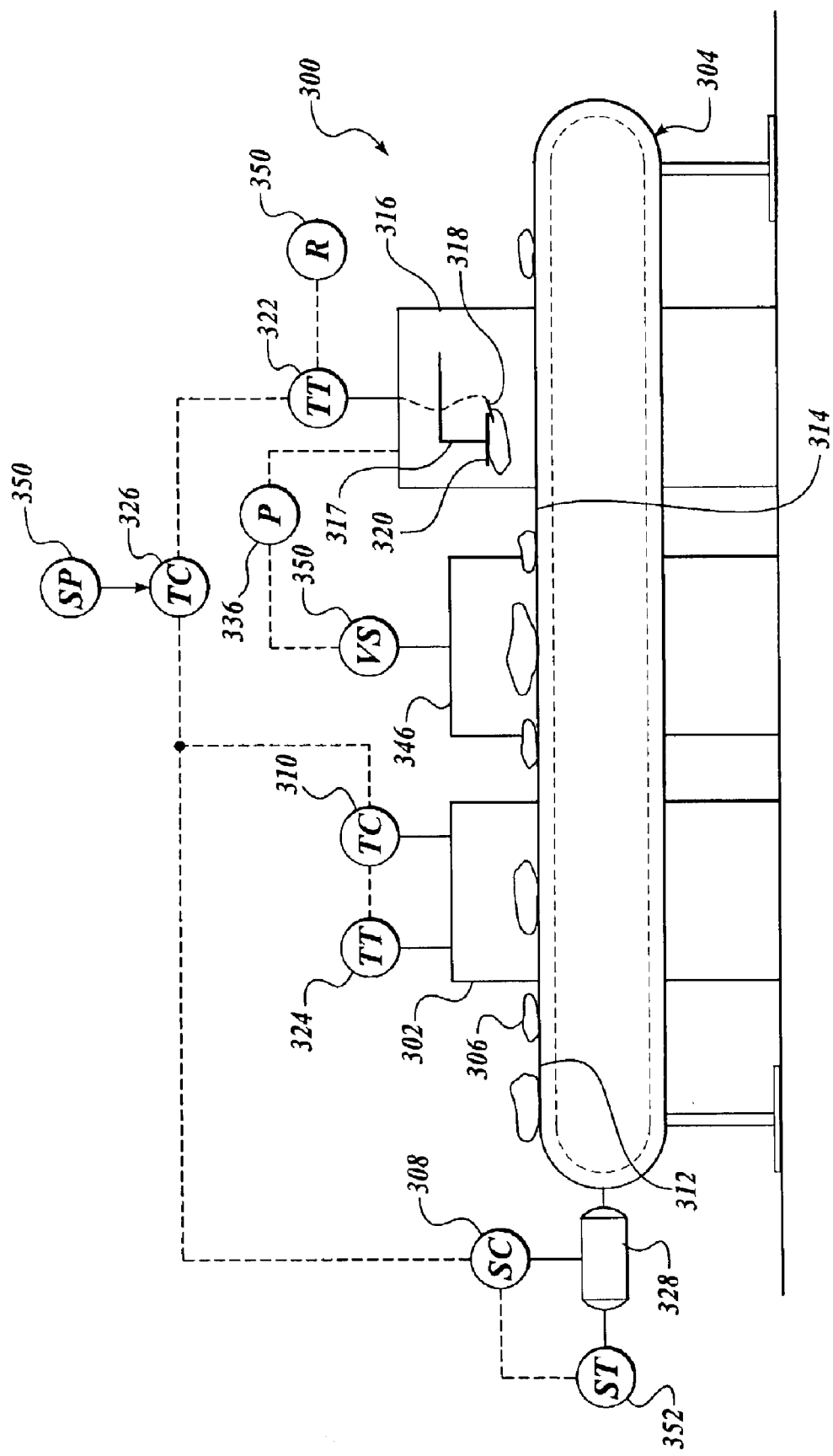
FIG. 3 shows a schematic illustration of an embodiment of a system for processing food items according to the present invention.

Referring initially to FIGS. 1, 2, and 3 in general terms, the apparatus according to the present invention includes a heat engine 102, 202, 302, operable in coordination with a moving conveyor 104, 214, 304, respectively, for supporting workpieces to be processed in the heat engine, and to carry the workpieces to a temperature measuring station 116, 216, 316, respectively. Measuring stations house translatable assemblies 117, 217, 317, having a temperature probe and, in some instances, a pick-up tool. The translatable assemblies will be described in greater detail below.

In one embodiment a pick-up tool operates in conjunction with a temperature probe. Pick-up tool 120, 220, 320, picks up a selected workpiece off the conveyor while a temperature probe 118, 218, 318, is configured to measure the temperature of the workpiece.

In one embodiment, the workpiece is carried along by the assembly at or about the * speed of the conveyor during temperature measurement and then the workpiece is released back onto the conveyor. The assembly is then retracted to its starting position and made ready for the next workpiece.

In one embodiment, wherein a pick-up tool is not used, the temperature probe may be lowered to the level of the workpiece. The workpiece temperature may be measured as the workpiece moves along the conveyor. The temperature probe moves with the workpiece at or about the conveyor speed for a suitable period to accurately determine its temperature.

In either embodiment, the translatable assembly motion is repetitive and carried out at a desired time interval, so as to be incorporated with conveyor systems. For instance, based on the type of workpiece or the conveyor loading and speed, it may be desirable to vary the interval between temperature measurements. Such intervals can be of a selected length. However, for food items, including chicken breasts, the interval between measurements, and consequently, the duration of such measurements is about 1 minute with a 45-second interval between measurements. However, the present invention can be configured for any desired length temperature measurement or interval between measurements.

During the measuring period, it is typically not possible to measure the temperature of all workpieces. As a consequence, many workpieces go unmeasured. To this end, techniques are in place to help ensure that the minimum temperatures are being met. For instance, in the embodiments that follow, methods and apparatus are described for selecting the workpieces most likely to be the most resistant to temperature changes, i.e., the thickest or the largest of the workpieces for a given population. Another common problem is that of overlapping workpieces which act as insulators to the workpieces underneath. The techniques described below address this problem by separating the workpieces or providing a signal or alarm when the overlapping condition exists. Appropriate action can then be taken. Other techniques for helping to ensure all workpieces meet the minimum or maximum temperature include predictive modeling. Such modeling can be used in a controller for feed forward control or to control temperature during the actual measuring period. All of the techniques herein described can be adapted to use the temperature measurement to provide temperature feedback to control one or more process parameters and arrive at the desired measured temperature of the workpiece.

2. Embodiment

Referring now to FIG. 1, an embodiment of an automated temperature measurement system 100 according to the present invention is schematically illustrated. The system 100 includes a heat engine 102. As used herein, the term "heat engine" is used to refer to a device which is capable of adding heat to workpieces, so as to, in some instances, cook the workpieces or removing heat from workpieces so as to cool the workpieces, in some instances to the point of freezing and below. Heat engines may have a plurality of sensors for measuring temperature, air velocity and relative humidity at one or more processing zones. It is to be appreciated that the heat engine can be configured to vary any one of these or other parameter. In one embodiment, the processing temperature may be varied to a desired range by utilizing a temperature controller 126. Temperature controller 126 output can cascade to heat engine controller 110 or conveyer driver speed controller 108. Alternatively, temperature controller 126 output can be sent directly to the heat engine 102 or to the conveyor driver 128. It is also to be appreciated that the present invention can find use in other processes not related to food. Workpieces as used herein broadly includes any item which can be thermally processed and which requires the measurement of its temperature, including food items, such as meat patties and bone-in chicken breasts.

A conveyor 104 is positioned to move the food items 106 through the thermal processing section of the heat engine 102. Heat engines may utilize the principles of radiation, convection, conduction and condensation to process workpieces. The conveyor 104 typically has a moving belt that slides over a support bed constructed in a standard manner. The conveyor belt is driven at a selected speed by the drive system 128 in a standard manner. The drive system 128 can be composed of a variable speed motor coupled to the conveyer speed controller 108, to adjust the speed of the belt. The workpieces may be carried on the conveyor belt to be processed by the heat engine 102 and then transported to the temperature-sensing station 116 located downstream of the heat engine 102. The amount of time which a workpiece is exposed to the thermal energy of the heat engine 102, can be adjusted by use of the conveyor speed controller 108. The heat engine 102 may also include a temperature controller 110. The temperature controller 110 can adjust a heat engine parameter to achieve control of a measured variable about a setpoint. For example, if the heat engine 102 is an oven, a temperature-measuring device 124 may be suitably mounted within any section of an oven. Thus, when the temperature controller 110 monitors that the temperature setpoint has been surpassed, the temperature controller 110 would automatically lower the processing energy to maintain the desired temperature within the oven, for example. Conversely, if the temperature is lower than desired, the temperature controller can direct the application of more energy to raise the measured temperature to the desired setpoint or otherwise vary a parameter including the humidity to increase the rate of heat transfer. In general, controllers used in the apparatus of the present invention have modules for implementing an algorithm that controls a controllable variable in order to maintain a measured variable at a desired setpoint.

The conveyor 104 includes an incoming conveyor run 112 leading to the heat engine 102 and an outgoing conveyor run 114 leading out of the heat engine 102. Conveyor run 112 delivers food items 106 to the heat engine 102 to be processed therein. The translatable assembly 117, which will be described in more detail below, is placed in proximity to the outgoing conveyor run 114 and is mounted downstream of the heat engine 102 to have access to the workpieces on the conveyor. However, it is to be appreciated that heat engine 102 and assembly 117 can be built as an integrated single piece of equipment. A bi-directional carriage structure 117 as is disclosed in U.S. Pat. No. 5,868,056, the disclosure of which is hereby fully incorporated by reference, can be modified as further described herein to provide a suitable translatable assembly 117 having a temperature probe 118 mounted thereon. (Hereinafter the term "translatable assembly" shall also refer to a "carriage structure.") By use of an existing carriage structure in the present invention, the temperature probe 118 can be moved transversely to the conveyor run 114, and can also be moved longitudinally, along with the conveyor run 114 to place the temperature probe 118 at any location on the conveyor run 114. In one embodiment, the temperature probe 118 is insertable into workpieces 106 leaving the heat engine 102. The carriage structure 117 moves the probe 118 at or about the conveyor speed to allow the probe 118 to reach equilibrium with the workpiece 106.

Additionally, a pick-up tool 120, as is disclosed in U.S. application Ser. No. 09/619,423, the disclosure of which is fully incorporated herein by reference, can be configured to cooperate with the carriage structure 117 to pick up the exiting workpieces 106 before insertion of the temperature probe 118. In one embodiment, the pick-up tool 120 and temperature probe 118 need not travel with the conveyor. In this embodiment, the workpiece is held for the desired time to allow the probe 118 to reach equilibrium with the workpiece 106. Both pick-up tool 120 and temperature probe 118 can be mounted to the carriage structure 117. The temperature probe 118, as mounted on the carriage structure 117, can then be inserted into the picked-up workpiece 106. The carriage structure can hold the workpiece for a predetermined period of time and then release the workpiece back onto the conveyor.

Alternatively, the carriage structure 117 with the pick-up tool 120 and probe 118 may be configured to move along at or about the same speed as the conveyor for a predetermined length of time and then release the food item back onto the conveyor. Further, alternatively, only the temperature probe 118 may be mounted on the carriage structure 117. In this instance, the probe 118 is mounted to a downwardly actuated mechanism, such as a pneumatically actuated piston with a spring return which drives the probe 118 into the workpiece. The probe 118 preferably travels at or about the conveyor speed for a suitable time period to accurately determine the temperature of the workpiece.

The temperature probe 118 is in signal communication with the conveyor speed controller 108 or the temperature controller 126. However, it is to be appreciated that additional or fewer controllers can use the probe temperature as an input signal. In one embodiment, the conveyor speed controller 108 can receive the output from temperature controller 126. The temperature registered by the temperature probe 118 is compared to a temperature setpoint 134. The error or differential is used in calculating a revised speed setpoint, for example, which is then sent to the conveyor speed controller 108. The speed controller 108 determines a suitable output signal to the conveyor driver 128 using the measured speed 132 and temperature controller 126 output, which then drives the conveyor 104 at a revised computed speed so that workpieces reach the proper temperature. Alternatively, temperature controller 126 can send direct output to the conveyor driver 128. It is to be appreciated that controllers include the necessary hardware and software (if needed) to perform control algorithms to control the measured temperature of workpieces at the temperature probe 118 by controlling the speed of conveyors or heat engine temperatures (controlled variables). Accordingly, a temperature feedback control loop is achieved.

Additionally, or alternatively, the signal 122 from the temperature probe 118 can be sent to the heat engine temperature controller 110. Temperature controller 110 uses a temperature setpoint to determine its output. The setpoint can be calculated by the temperature controller 126 based on the error or differential between the setpoint 134 and the actual temperature 122. The temperature controller 110 then may use this setpoint and compute the error or differential with the measured temperature at 124 to determine an output value. The output from the temperature controller 110 can be sent, for example, to a rheostat to increase the amount of heat that is provided by the heat engine 112. Alternatively, temperature controller 110 can control the coolant flow, heat medium flow, fan, coolant pressure, humidity or otherwise regulate a controlled variable which in turn influences the temperature within the heat engine 102 to arrive at the desired temperature setpoint being measured by the temperature probe 118.

The signal from the temperature probe 118 can also be recorded by a recorder 130. The recorder 130 can record the time as well as the temperature being measured by the temperature probe 118. Such information can be useful to collect trend data for a variety of reasons. Data acquisition and data storage are increasingly important to the industry as more regulations, like the HAACP guidelines, are requiring these temperatures to be archived.

3. Embodiment

Referring now to FIG. 2, an embodiment of a system 200 for automatically measuring the temperature of workpieces leaving a heat engine 202 is schematically illustrated. The system 200 has components which are similar in some respects to the components of the system 100 illustrated in FIG. 1. The system 200 further includes a scan system 232 in addition to the heat engine 202 and the measuring station 216. The scan system 232 is located ahead of the heat engine 202. The scan system 232 can have radiation emitters and detectors such as video cameras, diodes, x-rays, lasers and the like, to enable the scanning of workpieces 206 to determine if there are overlapping workpieces 234. In one embodiment, the scan system 232 may include a standard video camera equipped to produce a suitable signal 248 or signals which are processed and interpreted by a processor 236, having a memory which contains suitable algorithms to process the signals generated by the video camera. The output can then be used to determine whether overlapping of individual workpieces on the conveyor has occurred.

The signal produced by the scan system 232 can eventually be used by conveyor speed controllers 238 and 240, temperature controllers 210 and 226, or otherwise be used in any desired manner. For instance, the signal generated by the scan system 232 can be used by the conveyor speed controller 238 and/or 240 to speed up or slow down the conveyors 212 and/or 214 to cause separation of the overlapping workpieces 234. For example, in one embodiment, two independent conveyor runs, 212 and 214, respectively, cooperatively form a combined run 204 that extends at least the length of system 200. Conveyor 212 can be independently controlled apart from conveyor 214. Each conveyor 212 and 214 has a speed controller 238 and 240, respectively, and each conveyor has a driver 242 and 244, respectively. Thus, when the signal 248 from the scan system indicates overlapping workpieces, conveyor 212 can be slowed down. Additionally or alternatively, conveyor 214 can be sped up. In this fashion, the relative speeding up of the forward conveyor 214 in relation to the rear conveyor 212 can separate the workpieces which overlap with one another. Alternatively or additionally, the signal generated by the scan system 232 can be used to raise an alarm which alerts an operator to take appropriate action, which may include manually separating any overlapping workpieces on the conveyor before they enter the heat engine 202.

The conveyor 214 includes an incoming conveyor run leading to the heat engine 202 and an outgoing conveyor run leading out of the heat engine 202. A translatable assembly structure 217, which will be described in more detail below, is placed in proximity to the outgoing conveyor run and is mounted downstream of the heat engine 202 to have access to the workpieces on the conveyor. A bidirectional carriage structure 217, such as is disclosed in U.S. Pat. No. 5,868, 056, can be modified as described herein to provide a suitable translatable assembly 217 having a temperature probe 218 mounted thereon. By use of an existing carriage structure in the present invention, the temperature probe 218 can be moved transversely to the conveyor 214 and can also be moved longitudinally along with the conveyor 214 to locate the temperature probe 218 at any location on the conveyor. In one embodiment, the temperature probe 218 is insertable into workpieces 206 leaving the heat engine 202 on the conveyor run 214.

Additionally, a pick-up tool 220 such as is disclosed in U.S. application Ser. No. 09/619,423, can be configured to cooperate with the carriage structure 217 alongside the conveyor 214 to pick up the exiting workpieces 206 before insertion of the temperature probe 218. In this case, both the pick-up tool 220 and the temperature probe 218 can be mounted on the carriage structure. The pick-up tool 220 picks up and holds the workpieces while a temperature probe 218 measures the temperature for a suitable time period to accurately determine the temperature. In another embodiment, only the temperature probe 218 may, be provided on the carriage. The probe 218 can be actuated in a generally downward motion to reach the workpiece. The probe 218 may travel at or about the conveyor speed for a suitable time period to accurately determine the workpiece temperature.

The temperature probe 218 is in signal communication with the speed controller 240 or the temperature controller 226. However, it is to be appreciated that additional or fewer controllers can use the probe temperature signal as an input signal. In one embodiment, speed controller 240 may receive the output from temperature controller 226. The temperature registered by the temperature probe 218 is compared to a temperature setpoint 250. The error or differential can be used in calculating a revised speed setpoint, for example, which can then be sent to the conveyor speed controller 240. The speed controller 240 determines a suitable output signal to the conveyor driver 244 using the measured speed 252 and temperature controller 226 output, which drives the conveyor 214 at the revised computed speed so that workpieces reach the proper temperature. Any adjustment of conveyor 214 may result in having to speed up or slow down conveyor 212. Therefore, signal communication is established between the conveyor speed controllers 238 and 240, and suitable algorithms are in place to control both separation and temperature. Alternatively, temperature controller 226 can send direct outputs to the conveyor driver 244. It is to be appreciated that controllers include the necessary hardware, and software (if needed) to perform control algorithms to control the measured temperature of workpieces at the temperature probe 218 by controlling the speed of the conveyor 214 or heat engine temperature 224 (controlled variables).

Additionally or alternatively, the signal 222 from the temperature probe 218 can be sent to the heat engine temperature, controller 210. Temperature controller 210 may use a temperature setpoint to determine its output. The setpoint can be calculated by the temperature controller 226 based on the error or differential between the setpoint 250 and the actual temperature 222. With this information, the temperature controller 210 can compute the error or differential with the measured temperature at 224 to determine an output value. The output from the temperature controller 210 can be sent, for example, to a rheostat to increase the amount of heat that is provided by the heat engine 202. Alternatively, the temperature controller 210 can control the flow of a coolant, heat medium flow, fan, coolant pressure, or otherwise regulate one or more controlled variables which in turn influence the temperature within the heat engine 202 to arrive at the desired temperature setpoint being measured by the temperature probe 218.

The signal from the temperature probe 218 can be recorded by a recorder 230. The recorder 230 can record the time as well as any temperature being measured by the temperature probe 218. Such information can be useful to collect trend data for a variety of reasons.

4. Embodiment

Referring now to FIG. 3, another embodiment of a system 300 used for the automatic temperature measurement of food items is illustrated. The system 300 has components which are similar in some respects to the components of the system 100 of FIG. 1 and the system 200 of FIG. 2. However, in the embodiment illustrated in FIG. 3, a scan system 346 is located downstream of the heat engine 302 and ahead of the temperature measuring station 316. The scan system 346 may include a video camera, a data processor 336, including a memory, in which algorithms may be used to, determine the largest of the workpieces 306 in any given population of workpieces passing on the conveyor 304. Not only can the scan system 346 determine the largest of the food items, it also is capable of tracking the largest workpiece and producing a signal 350 in relation thereto. The output from the processor 336 may be sent to a positioner on the assembly 317 that directs the positioning of the carriage structure. Based on the signal produced by the scan system 346, the pick-up tool 320, and temperature probe 318 are targeted at the largest of the workpieces. As with the previous embodiments described above, the carriage 317 can include the pick-up tool 320 and temperature probe 318, where the pick-up tool 320 holds the workpiece for a suitable length of time while the probe 318 accurately measures the temperature. Alternatively, the probe 318 can be mounted on the carriage 317, which is configured to actuate downwardly and longitudinally so as to travel with the workpiece for a suitable length of time to accurately determine the temperature of the workpiece. By selecting the largest of workpieces from a group, it is assured that the remainder of the lesser-sized workpieces will attain the required minimum temperature. This is because in smaller-sized food items, the resistance to heat transfer or intake is reduced as compared with the larger sized items.

The conveyor 304 includes an incoming conveyor run 312 leading to the heat engine 302 and an outgoing conveyor run 314 leading out of the heat engine 302. Conveyor run 312 delivers workpieces 306 to the heat engine 302 to be processed therein. The translatable carriage structure 317, which will be described in more detail below, is placed in proximity to the outgoing conveyor run 314, and is mounted downstream of the heat engine 302 and the scan system 346. A bidirectional carriage system, as disclosed in U.S. Pat. No. 5,868,056, may be modified as described herein to provide a suitable translatable carriage system 317 having a temperature probe 318 mounted thereon. By use of an existing carriage structure in the present invention, the temperature probe 318 can be moved transversely to the conveyor 314 and can also be moved longitudinally along with the conveyor 314 to locate the temperature probe 318 at any location on the conveyor. In one embodiment, the temperature probe 318 is insertable into workpieces 306 leaving the heat engine 302 on the conveyor run 314.

Additionally, a pick-up tool 320 as is disclosed in U.S. application Ser. No. 09/619,423, can be configured to cooperate with the carriage structure 317 alongside the conveyor 304 to pick up the exiting workpieces 306 before insertion of the temperature probe 318. In this case, both the pick-up tool 320 and the temperature probe 318 can be mounted to the carriage structure 317. The pick-up tool 320 picks up and holds the items while a temperature probe 318 measures the temperature for a suitable time period to accurately determine the temperature. In another embodiment, only the temperature probe 318 may be provided on the carriage 316. The probe 318 can be actuated in a downward motion to reach the workpiece. The probe 318 can also travel at or about the conveyor speed for a suitable time period to accurately determine the workpiece temperature.

The temperature probe 318 is in signal communication with a speed controller 308 or temperature controller 326. However, it is to be appreciated that additional or fewer controllers can use the probe temperature as an input signal. In one embodiment, speed controller 308 receives the output from temperature controller 326. The temperature registered by the temperature probe 318 is compared to a temperature setpoint 350. The error or differential in temperatures may be used in calculating a revised speed setpoint, for example, which is then sent to the conveyor speed controller 308. The conveyor speed controller 308 determines a suitable output signal to the conveyor driver 328 using the measured speed 352 and temperature controller 326 output, which drives the conveyor 304 at the computed revised speed so that workpieces reach the proper temperature within the heat engine 302. Alternatively, temperature controller 326 can send direct output to the conveyor driver 328. It is to be appreciated that controllers include the necessary hardware and software (if needed) to perform control algorithms to control the measured temperature of workpieces at the temperature probe 318 by controlling the speed of the conveyor 304 or heat engine temperature 324 (controlled variables).

Additionally or alternatively, the signal 322 from the temperature probe 318 can be sent to the heat engine temperature controller 310. Temperature controller 310 may use a temperature setpoint to determine its output. The setpoint can be calculated by the temperature controller 326 based on the error or differential between the setpoint 350 and the actual temperature 322. With this information, the temperature controller 310 can compute the error or differential with the measured temperature at 324 to determine an output value. The output from the temperature controller 310 can be sent, for example, to a rheostat to increase the amount of heat that is provided by the heat engine 302. Alternatively, the temperature controller 310 can control a coolant flow, heat medium flow, fan, coolant pressure, or otherwise regulate one or more controlled variables which in turn influences the temperature within the heat engine 302 to arrive at the desired temperature setpoint being measured by the temperature probe 318.

The signal from the temperature probe 318 can also be recorded by a recorder 330. The recorder 330 can record the time as well as any temperature being measured by the temperature probe 318. Such information can be useful to collect trend data for a variety of reasons.

5. Temperature Measuring Station

Figure 4:
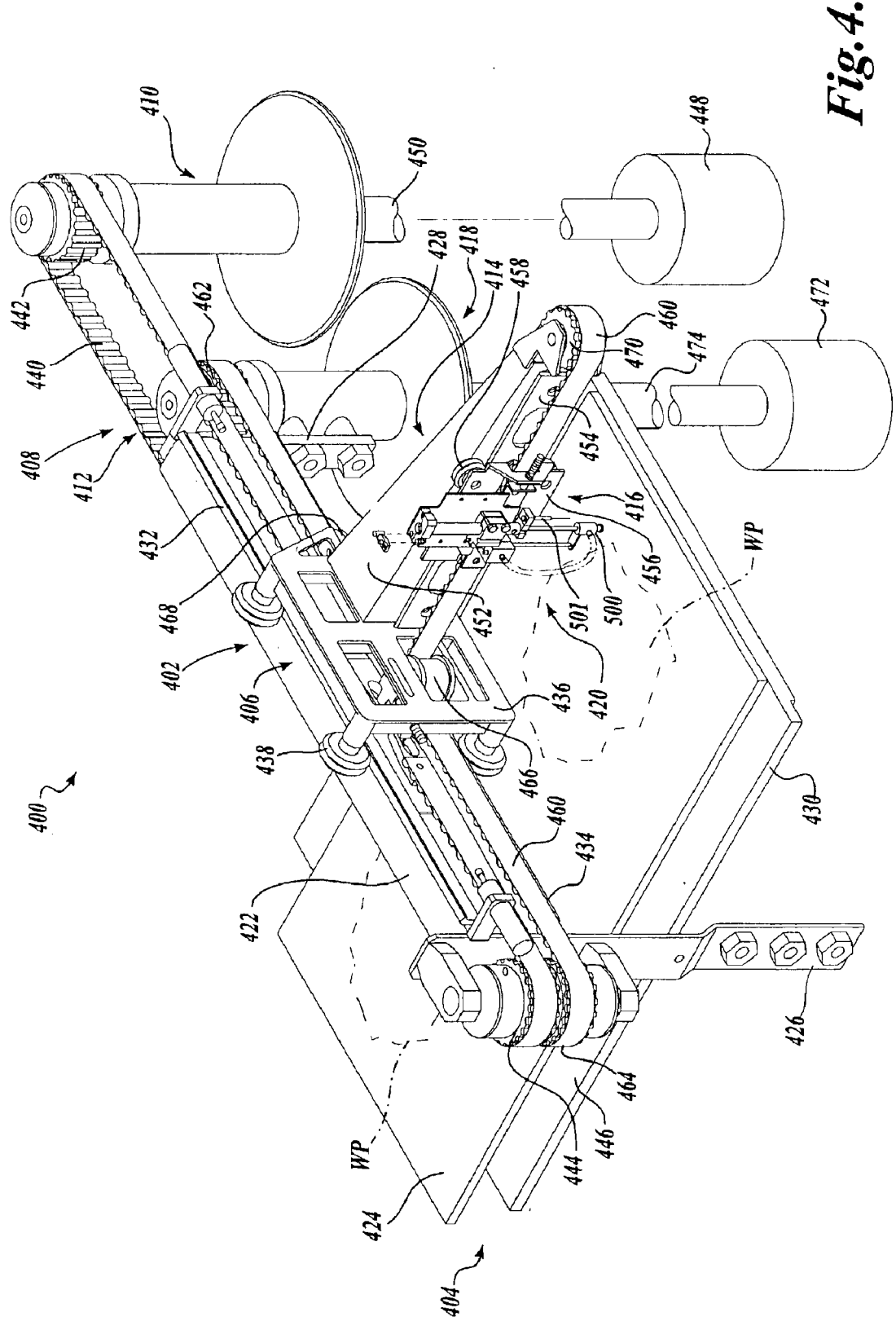
FIG. 4 shows an illustration of an embodiment of a carriage system for translating a pick-up tool and temperature-sensing device above a conveyor according to the present invention.

Referring now to FIG. 4, a suitable carriage structure for use in any of the above-described embodiments is shown. The carriage structure may be used for locating an assembly including the temperature probe 501, or alternatively, in combination with a pick-up tool 500. The temperature probe 501, alternatively, combined with the pick-up tool 500 may replace the work tool 30, described in the above-identified patent. In one particular embodiment, the temperature probe 501 can include a wireless transmitter to communicate a signal indicative of temperature to a remote device which will process the signal and execute a process in response thereto. The fact that the carriage structure disclosed in the above-identified patent can translate both laterally and longitudinally with respect to the conveyor makes it particularly suitable for use in the embodiments of the present invention. For example, in some embodiments, the scan system will be able to detect the thickest portion of a workpiece or the largest workpiece. Assuming the thickest portion of the workpiece or the largest workpiece is the most likely to be the coldest or the most resistant to temperature change, the temperature probe 501 can be translated from side to side and in the direction of the conveyor, accomplished by the transversely movable carriage 406, and secondly, by the longitudinally movable carriage 416. In this manner, the temperature probe 501 can be positioned at any location on an x-y plane, and further, once the temperature probe 501 is positioned on the workpiece, the temperature probe 501 can move longitudinally at the conveyor speed for a suitable length of time to allow thermal equilibrium and obtain a more representative temperature reading of the workpiece. Additionally or alternatively, a pick-up tool 500 can likewise be mounted on the carriage structure. In this manner, the workpiece is lifted off the conveyor and held for a predetermined time to allow the measurement of its temperature.

FIG. 4 illustrates one particular embodiment of a carriage assembly 400 that may be utilized in conjunction with the pick-up tool 500 and the temperature probe 501 in the temperature measuring stations 116, 216, 316, of the present invention. The assembly 400 in basic form includes a support structure 402 extending across the conveyor 404 for supporting and guiding a carriage 406 for movement transversely to the direction of movement of the conveyor 404. The carriage 406 is powered by a drive system 408 including in part, a motive system 410, and a drive train 412. A second, longitudinal support structure 414 is cantilevered outwardly from carriage 406 in a direction generally aligned with a direction of movement of the conveyor 404. A second longitudinal carriage 416 is adapted to move along longitudinal support structure 414 by the drive system 408. In this regard, a second motive system 418 powers the longitudinal carriage 416 through the drive train 412. A temperature probe 501 and pick-up tool assembly 500 is mounted on the longitudinal carriage 416 to move therewith.

As shown in FIG. 4, the transverse support structure 402 may include a beam structure 422 that extends transversely across the conveyor 404 at an elevation spaced above conveyor 424. The ends of the beam 422 may be supported by brackets 426 and 428 extending upwardly from the conveyor's support structure 430. The carriage support structure 402 also may include a track for guiding the carriage 406 along beam structure 422, composed of an upper rail 432 and a lower rail 434 attached to the face of the beam structure 422 facing the carriage. The carriage 406 may include a generally rectangular shaped bed 436 with rollers 438 attached to the corners of the bed.

The carriage 406 may be powered to move back and forth along beam structure 422 by motive system 410. A drive belt 440 extends around a drive pulley 442 located at the upper end of the motive system 410 and also around an idler pulley of an idler assembly mounted on the upper end of bracket 426. The belt 440 makes a loop around the beam structure 422, extending closely along the side walls of the beam, with the ends of the belt connected to the back side of bed 436.

The motive system 410 may include the servo motor 448 controllable by a computer to move the carriage 406 back and forth along beam structure 422 as desired. A drive shaft 450 extends up from the servo motor 448 to power the drive pulley 442. As further shown in FIG. 4, the longitudinal support structure 414 cantilevers transversely from carriage 406 and carried by the carriage 406. The support structure 414 may include a beam member 452 that tapers in the direction of its distal end. An elongate track 454 extends along one side of the beam member 452 for guiding the longitudinal carriage 416. The carriage 416 includes a substantially planar, rectangularly shaped bed 456 and rollers 458 at each of its corners adapted to ride along the upper and lower edges of a track 454.

Carriage 416 may be moved back and forth along track 454 by the drive system 408. In this regard, the drive system may include a second motive system 418, constructed similarly to motive system 410, to power a drive belt 460 which is trained around a drive pulley 462 mounted on the upper end of motive system 418 and also trained around an idler pulley 464, which is located below idler pulley 444. The belt 460 also trains around idler pulleys 466 and 468 mounted on carriage 406. A further idler pulley 470 is mounted on the distal end of beam 452. The ends of the belt 460 are attached to the bed 456 of carriage 416 so that rotation of the drive pulley 462 results in movement of the belt 460, which in turn, causes longitudinal carriage 416 to move along track 454. As with motive system 410, motive system 418 may include a servo motor 472, which is drivingly engaged with drive pulley 462 by a drive shaft. The servo motor 472 may be controllable by a computer to move the carriage 416 back and forth, generally in a direction parallel to the movement of the conveyor. The speed of carriage 416 can be controlled to match the belt speed of conveyor 404. To this end, a speed controller or properly geared train can drive the carriage 416 at or about the same speed as the conveyor belt.

In operation, as workpieces are carried along conveyor 404, the pick-up tool/temperature probe assembly 420 is moved along selected paths of travel by carriages 406 and 416 powered by drive system 408. Carriage 406 moves the assembly 420 transversely, and carriage 416 moves the assembly longitudinally relative to the direction of travel of the conveyor 404. This enables the assembly to travel quickly along complicated-routes which are programmed into the operation of the servo motors of the motive systems 410 and 418 by a computer.

Furthermore, in some instances, the assembly 420 shown in FIG. 4, may also be translatable in a third direction, which can position the suction/temperature probe 500 assembly at any height above the conveyor 404 in the z direction. A suitable downwardly actuating assembly is described below.

In another embodiment, a robotic arm can be used in place of a carriage assembly. A robotic arm can carry the pick-up tool and temperature probe. A robotic arm typically has articulating members enabling the positioning of any tool at a desired location in response both to a positioning system and a drive system.

6. Off-Loading Station Assembly

Illustrated in FIGS. 5, 6, 7, 8, 9, 10, and 11, is an off-loader assembly of U.S. application Ser. No. 09/619,423 which can be modified for use as an off-loader in coordination with any of the embodiments described above. The off-loader can be used to transfer workpieces off or on to a conveyor. The assembly 616 includes one or a plurality of pick-up tools 712 for removing selected workpieces from conveyors. One embodiment of the off-load assembly 616 includes an overhead framed structure 700 that spans between the adjacent end of the portioning station cabinet 716 and a frame end structure 710. The overhead frame includes a plurality of side-by-side cabinets 702, each housing a drive system for associated pick-up tools 712 positioned below the cabinets. Preferably, each of the cabinets is generally rectangular in shape and has a front access door 718. Three side-by-side cabinets 702 are illustrated, with the cabinets attached to each other to create a rigid, unitary beam structure. The drive system includes, among other components, a servo motor 720 schematically shown in FIG. 9 as positioned above a servo motor cooling fan 722, which in turn is positioned on a mounting platform 724 spaced above cabinet floor 726 by a plurality of support legs 728. A coupling 730 is attached to the output shaft (not shown) of the servo motor and also attached to the upper end of a drive shaft 732 that extends through an opening formed in cabinet floor 726. A drive pulley 734 is coupled to the lower end of the drive shaft 732.

The pick-up tools 712 are carried by carriages 708 that ride along frame assemblies 704 that in turn are attached to the underside of cabinets 702 by a mounting bar 736 attached to and extending along the underside of the cabinet floor 726 in a direction generally transversely to the direction of travel of conveyor. The mounting bar 736 projects from a generally rectangular shaped mounting flange 738, also attached to the underside of the cabinet floor 726. A drive shaft hub 740 projects downwardly from a clearance hole formed in the mounting flange 738 for receiving the drive shaft 732 therethrough. Preferably, roller or other types of bearings are positioned within the upper and lower end portions of the hub 740 for positioning and supporting the drive shaft 732.

The carriage frame assemblies 704 each include a longitudinal beam 742 attached to the underside of an edge flange 744 projecting upwardly from the beam along a portion thereof that is positioned below a corresponding cabinet 702. Longitudinal slots 746 are formed in the edge flange 744 through which extend hardware members, for instance, bolts that engage within threaded cross-holes extending through mounting bar 736. In this manner, the frame assembly 702 may be longitudinally adjusted relative to the mounting bar 736, as will be discussed more fully below. Spaced-apart upper and lower rod tracks 748 and 750 are mounted to beam 742 at the ends of the rod tracks by end flange plates 754 and 756, which are attached to the ends of the beam 742. A pair of rod tracks 748 is located on each side of the beam 742. An idler pulley 758 is spaced outwardly from flange plate 756 on an upright support shaft 760, which in turn is attached to upper and lower mounting ears 762 projecting from the upper and lower portions of flange plate 756. An endless cog or gear belt 764 spans between the drive pulley 734 and the idler pulley 760.

The tension on belt 764 may be adjusted by shifting the position of beam 742 and, thus idler pulley 758, relative to the drive pulley 734 so that moving the idler pulley away from the drive pulley will increase a tension on the belt 764, while shifting the idler pulley toward the drive pulley will reduce the tension on the belt. The movement of the beam 742 is accomplished through the use of a threaded stud 766 that projects outwardly from the end of mounting bar 736 through a clearance opening formed in a take-up tab 768 projecting upwardly from the upper surface of beam 742 at a position spaced a short distance from the end of the mounting bar. Hardware members in the form of nuts 770 are threadably engaged over stud 766 to bear against the opposite sides of the tab 768 thereby to position the tab relative to the end of the mounting bar 736. Once the desired tension of the belt 764 is achieved, the nuts 770 capture the tab 768 therebetween.

The pick-up tools 712 are mounted on carriages 708 carried by frame assemblies 774. The carriages 708 each include a slider block 772 secured to the four corner portions of a planar, substantially rectangular carriage plate 776. The slider blocks include clearance holes for receiving rod tracks 748, 750. Ideally, a bushing 778, or other anti-friction device, is pressed or otherwise securely positioned within the clearance hole of the slider block to help the carriage anti-frictionally slide along the frame assemblies 780.

Figure 6:
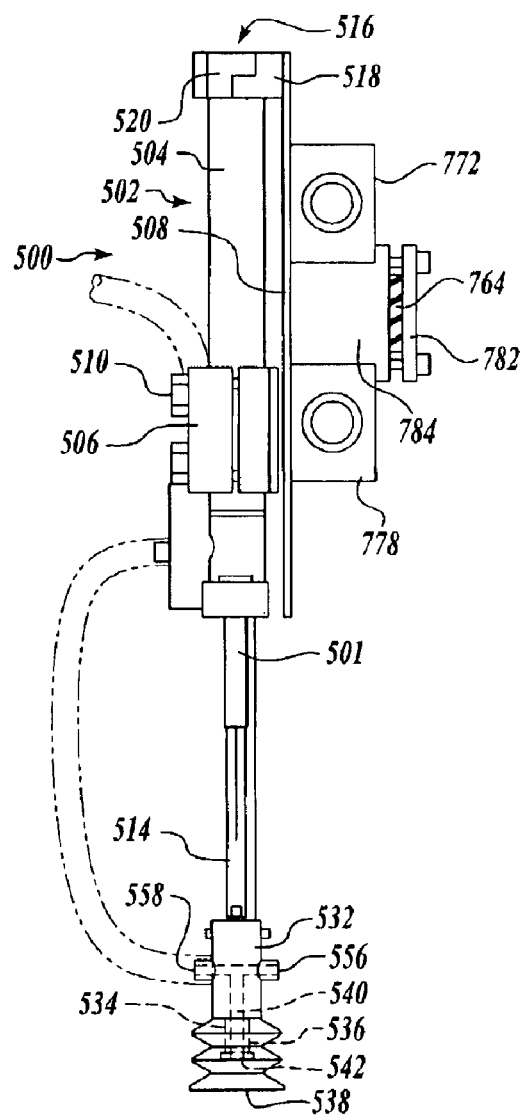
FIG. 6 shows a side view illustration of a pick-up tool according to the present invention.
Figure 7:
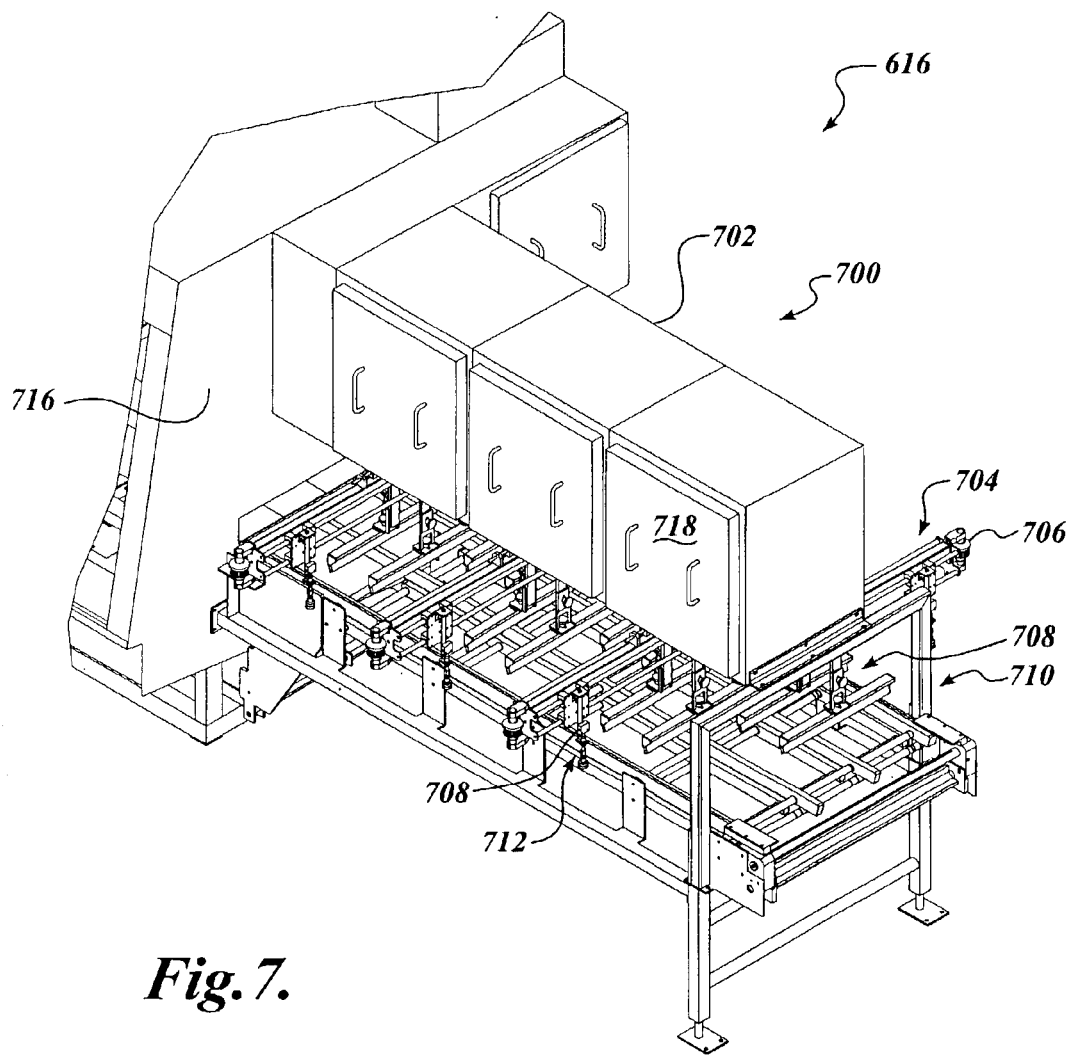
FIG. 7 shows an isometric illustration of an embodiment of an off-loader according to the present invention.
Figure 8:
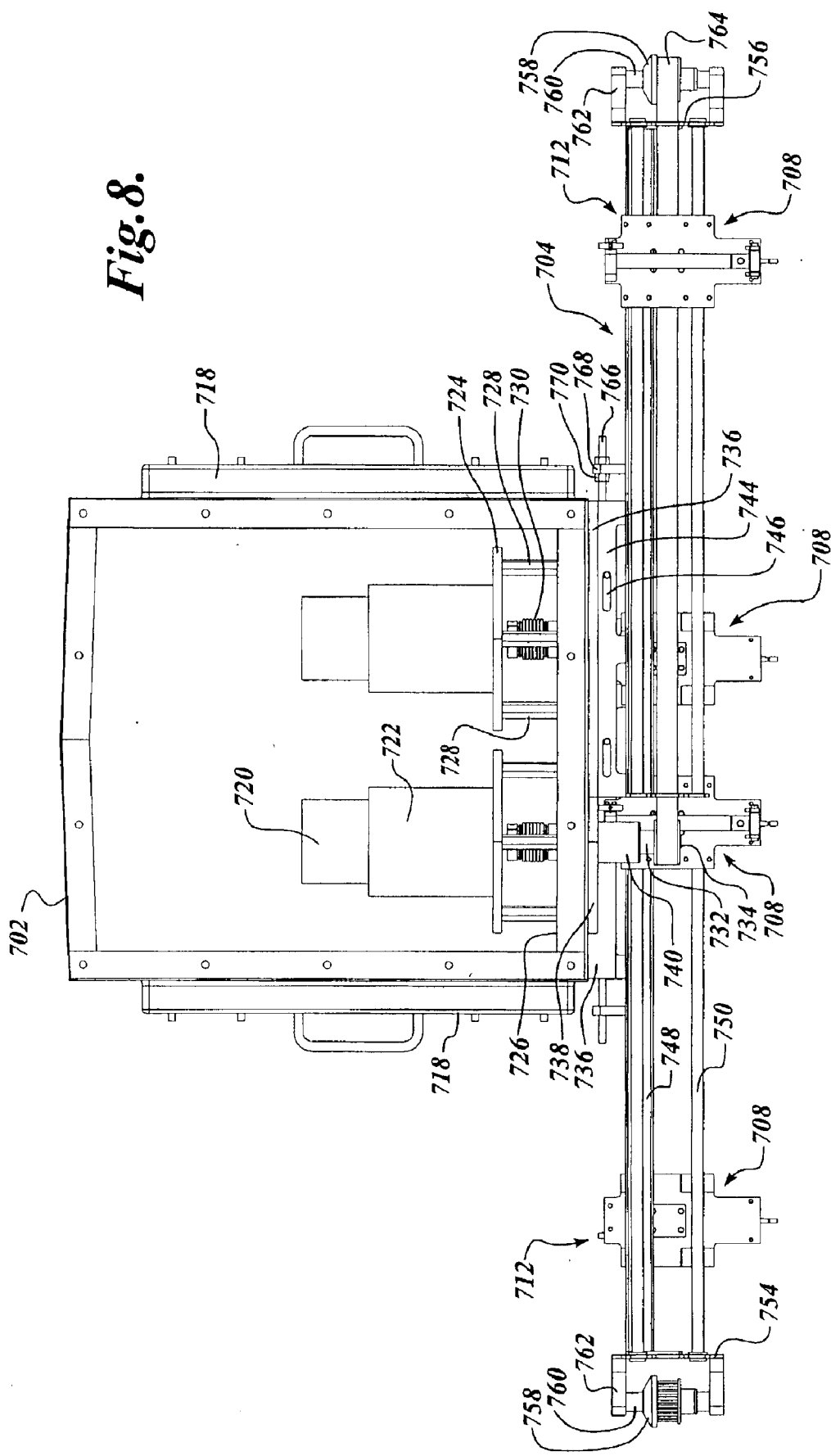
FIG. 8 shows a side view illustration of an embodiment of an off-loader according to the present invention.
Figure 9:
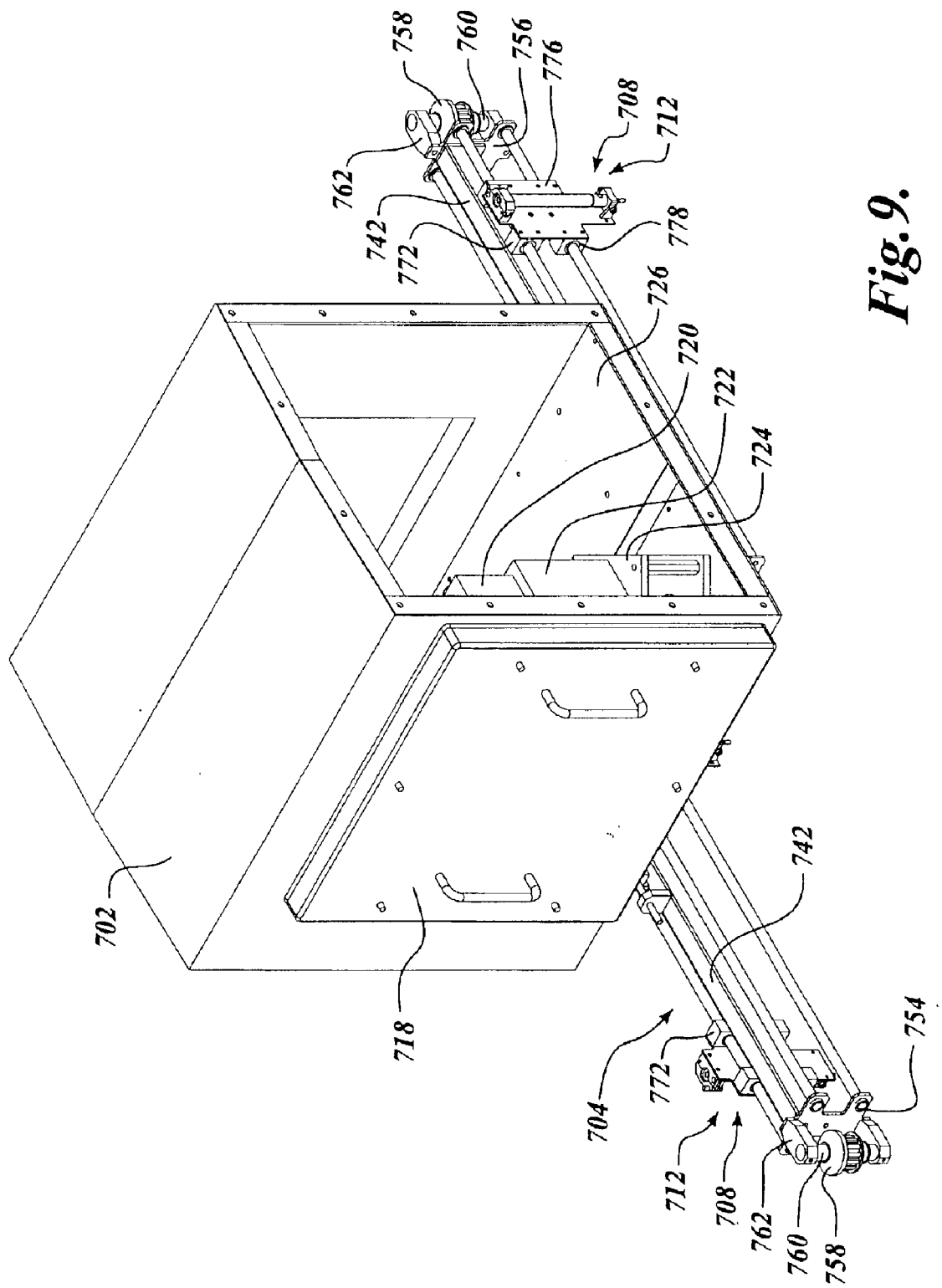
FIG. 9 shows an isometric illustration of an off-loader according to the present invention.

The carriage 708 is secured to the backside of carriage plate 776 by a clamping plate 782, which presses the belt 764 against a clamping block 784, secured to the back surface of the carriage plate 776 as best shown in FIG. 6. The surface of the clamping plate 782 facing the belt may be grooved to match the contour of the belt teeth so as to securely retain the belt between the plate 782 and the block 784. Hardware members extend through clearance holes formed in the plate 508 above and below the belt, within aligned threaded holes formed in the block 784. In this manner, the belt 764 is securely attached to the pick-up carriage 708 without having to drill holes or otherwise alter the belt 764.

Some embodiments, which are attached to the bed 456 of FIG. 4 do not require clamping plate 782, block 784, or slider blocks 772, 778.

It will be appreciated that with the apparatus of the present invention it is possible to continuously and quickly process workpieces, such as meat products. A computer is capable of keeping track of the sizes and other physical parameters of the workpiece as well as the location of such workpiece on the conveyors. The apparatus is capable of quickly, accurately, and repeatedly making distinctions among workpieces by which workpieces are graded and/or sorted. Moreover, meat products are processed in environments wherein the room temperature is typically at about 40 degrees, which is quite cold, and difficult for personnel to withstand on a daily basis; whereas the apparatus of the present invention is substantially immune to such cold temperatures.

7. Pick-Up Tools

Figure 5:
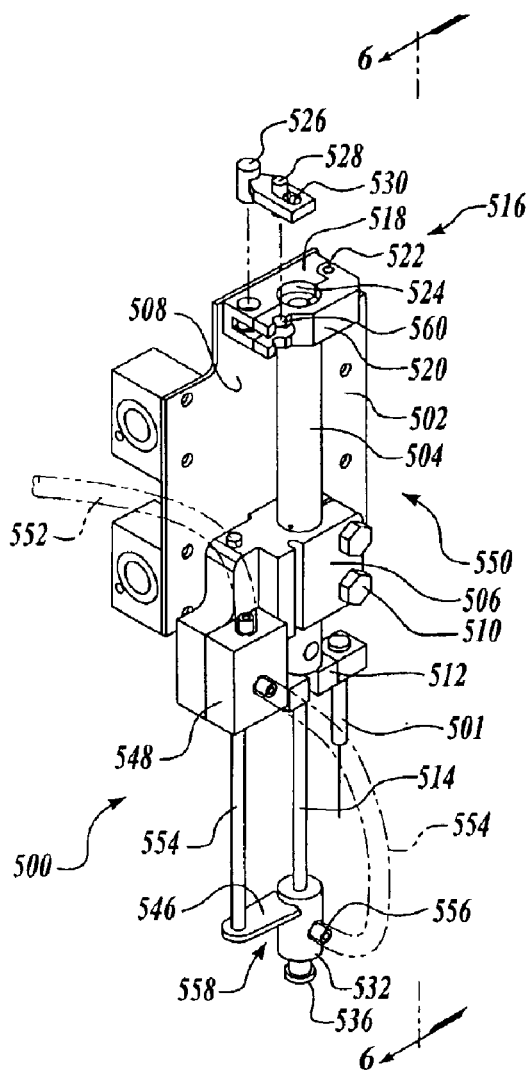
FIG. 5 shows an isometric illustration of an embodiment of a pick-up tool according to the present invention.

Referring specifically to FIGS. 5 and 6, a suitable suction device for use as a pick-up tool is illustrated. The suction device is described in the above-identified application as being used in conjunction with portioning, but can be readily adapted to ride on the carriage 416 with the temperature probe 501 of FIG. 4. Pick-up tools described herein can be used in the temperature measuring stations 116, 216, 316, or the off-loader station 616. FIGS. 5 and 6 show a pick-up tool specific for use with the offloader, but can be modified for use with a carriage assembly of FIG. 4 by removing the clamping bar 782, block 784 and slider blocks 772, 778.

The suction device 500 includes a linear actuator in the form of a pneumatic cylinder assembly 502, which is secured to and carried by the carriage 416 of FIG. 4 or any other carriage described herein that can be translated. The pneumatic cylinder may be coupled to a suction device 500 as further described below or replaced with a temperature probe 501 to actuate the probe downward to the level of the workpiece. The cylinder portion 504 of each cylinder assembly is held in place on carriage 416 by a lower attachment block 506 which is mounted on the carriage bed 508 by hardware members. A close-fitting clearance hole is vertically formed in attachment block 506 to slidably receive cylinder portion 504 therein. The lower end of the cylinder portion 504 abuts the upper surface of an end block 512, which has a narrow slot formed therein to provide clearance for the cylinder rod 514 which projects downwardly from the cylinder portion 504. The upper end of the cylinder portion 504 is securely held in place by a quick release clamp assembly 516 composed of a stationary half 518 and a pivotal half 520 hinged to the stationary half by a pin 522. The stationary half 518 and pivot half 520 of the clamp assembly 516 are shaped to define a circular receiving seat 524 for securely clamping against the upper end portion of the cylinder 504. The pivot half 520 is held in closed position by a spring-loaded pivot pin 526 that extends outwardly through clearance slots provided in the adjacent portions of clamp stationary half 518 and clamp pivot half 520 to extend through a clearance hole formed in a transverse pin 528. A compression spring 530 is engaged over the free end portion of pin 526 to press against transverse pin 528 so as to help retain the transverse pin engaged within a semicircular seat 560 formed in the pivot half 520.

Referring to FIGS. 5 and 6, a suction tip or head 532 is attached to the lower end of rod 514 for adherence to the workpiece being removed from conveyor. A compressible bellows cup assembly 534 is attached over an extension neck 536 projecting downwardly from the main body portion of tip 532. The bottom 538 of the bellows assembly is cup-shaped so as to achieve a secure attachment with the workpieces to be picked up. A center bore or passage 540 extends through the tip 532 and extension neck 536 to present an opening 542 at the bottom-of the extension neck.

In certain situations, it may be important to keep the suction tip 532 from rotating thereby to maintain the orientation of the workpiece. This is accomplished by use of a guide rod 544 having its lower end fixed to a tab 546 projecting outwardly from the generally cylindrically shaped suction tip 532. The upper end portion of the rod 544 slides within a vertical clearance hole formed in the attachment block 506. In this manner, guide rod 544 is disposed in a spaced parallel relationship with cylinder rod 514. Other systems can be utilized to prevent the suction tip 532 from rotating.

Suction is applied to the suction tip 532 by use of a venturi assembly 548. Pressurized air is supplied to the venturi assembly 548 by supply line 552. The venturi creates a source of reduced air pressure which is transmitted to suction tip 532 by line 554. that is connected to a side port 556 formed in the body of suction tip 532. This side port is in fluid flow communication with the central air passageway 540 extending longitudinally upwardly from the bottom of the suction tip to the elevation of the side port. Ideally, an air valve (not shown) is used to supply pressurized air to the venturi 548 to generate a reduced pressure air source when desiring to pick up, a workpiece item, while also supplying pressurized air to a second side port 558 of the suction tip 532 when desiring to break the suction connection between the cup assembly 538 and the item, thereby to disengage the suction tip from the item. The side port 558 is also connected in fluid flow communication with the tip air passageway 540. The positive pressure air source can also be used to "backblow" the suction tip 532 to clean out the suction tip or remove matter that may have become lodged therein. During this backblow operation, the air valve discontinues air flow to the venturi assembly 548 so as to not induce the matter to enter suction line 554.

In one embodiment, a temperature probe 501 is mounted to the end block 512. As the suction head 532 is refracted upwardly, the workpiece being carried by the suction head is pierced by the temperature probe 501, thus enabling temperature sensing of the workpiece.

Figure 12:
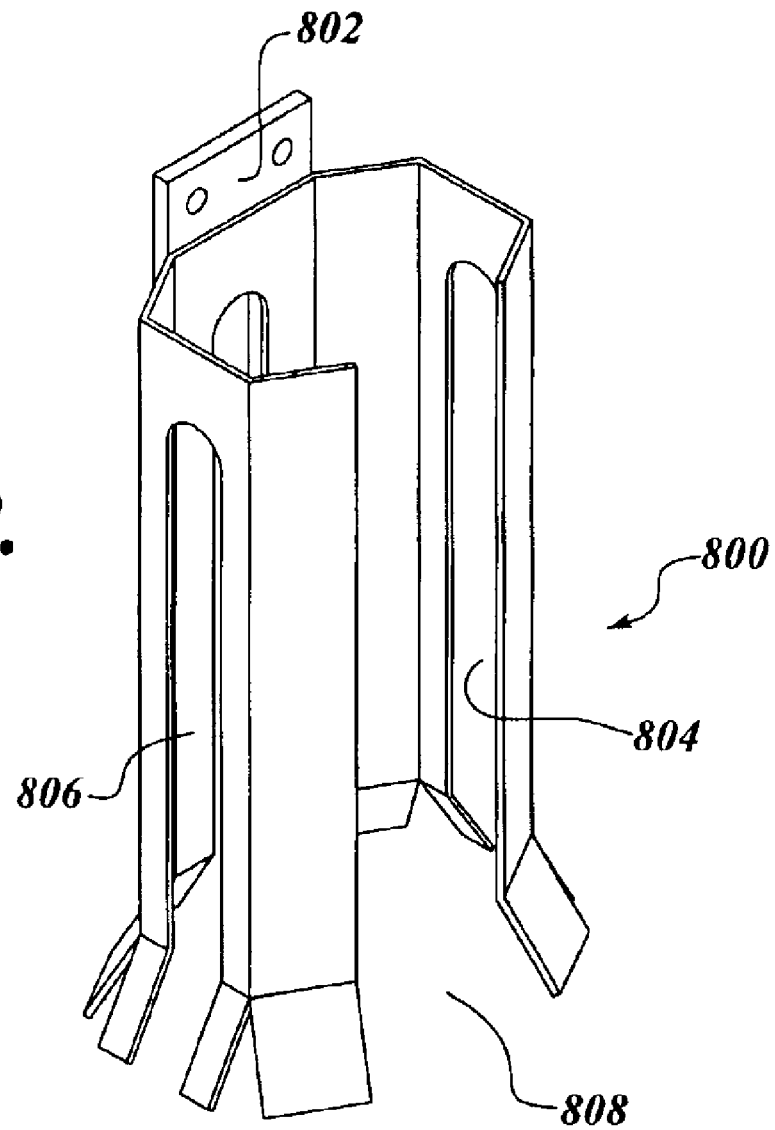
FIG. 12 shows an isometric illustration of an embodiment for a skirt for a pick-up tool according to the present invention.

Referring specifically to FIG. 12, the pick-up tools can include a retaining skirt or housing 800 designed to substantially surround the cylinder rod 514 and suction tip 532 of the pick-up tool, and thereby also surround the workpiece lifted off of the conveyors by the pick-up tool, as described more fully below. The skirt 800 is mounted on the carriages by a tab 802 projecting upwardly from the skirt 800 as shown in FIG. 12. Hardware members, not shown, extend through clearance holes formed in the tab to engage nuts (not shown). The skirt is generally in the shape of an octagon, with one panel missing to define a longitudinal gap 804 in the skirt to reduce the weight of the skirt. One or more of the panels may include slot 806 formed therein so as to reduce the weight of the skirt. At the bottom of the skirt, the panels flare outwardly so as to define an enlarged entrance opening 808 for the portioned workpiece as the portioned workpiece is lifted upwardly into the skirt by retraction of the pick-up tool.

It will be appreciated that the skirt/housing 800 may be of configurations other than that illustrated in FIG. 12. In this regard, a cage structure (not shown) composed of wire elements or other structural members may be utilized in place of the skirt 800. Such cage structure would provide lateral restraint to the workpiece being carried by the pick-up tool. As in the skirt/housing 800, the cage can be constructed with a bottom opening through which the workpiece passes upwardly when being removed from the conveyor and exits downwardly when being deposited at a location remote from the conveyor.

In general, when lifted upwardly, the workpiece enters the skirt or shroud 800 that substantially encircles the pick-up device and the workpiece and restrains the workpiece as the carriage travels. This travel occurs very quickly generating a high acceleration when beginning its lateral movement and a high deceleration rate when coming to a stop. Without the skirt 800, the workpiece, especially if a food product, may tend to swing back and forth during the high acceleration and deceleration of the carriage.

Further examples of pick-up tools are described in U.S. application Ser. No. 09/619,423, which is expressly herein incorporated by reference. The pick-up tool is described above as utilizing suction action to grasp the workpieces. However, other types of methods may be employed to pick up the workpieces. For example, if the workpiece is composed of magnetically conductive material, the pick-up tool may utilize a magnet. In addition, the pick-up tool may consist of a clamp or jaw structure capable of physically grasping the workpiece for lifting off the conveyor and then releasing the workpiece at a desired remote location from the conveyor. Alternatively, the pick-up tool may include forks or tines in place of the suction tip/head 532 to spear the workpiece. As a further alternative, the pick-up tool may consist of very cold (below freezing temperature) tabs that "stick" to the workpiece thereby to pick up the workpiece from the conveyor.

8. Temperature Probes

In one embodiment, the temperature probe 118, 218, 318, or 501 penetrates the surface of the workpiece. Such invasive probing of the items can produce very accurate temperature measurements. For example, the use of a 21-gauge (0.032" diameter) hypodermic needle can result in rapid equilibrium of the internal temperature of the workpiece and the probe and at the same time will leave an almost imperceptible penetration footprint on the workpiece. One example of such temperature probe is a thermocouple of the type "T", about 1.5 inches long. However, it is to be appreciated that other types of temperature measuring instruments also can be used.

It is not absolutely required that physical insertion takes place. The probes may be placed on the surface of the workpiece and modeling may be able to predict the interior temperature based on known thermal conductivities or other such physical parameters. In other instances, the temperature measurement can be non-invasive which avoids contact with the workpieces altogether. Such methods could use infrared radiation detectors to measure the workpiece temperature. It is also possible to have more than one temperature probe mounted on a carriage assembly. A plurality of temperature probes can be used to measure the temperature of more than one location on the workpiece. The use of multiple temperature probes is desirable, for instance, when measuring the temperature of irregular-shaped workpieces, such as bone-in chicken.

In another embodiment, a single temperature probe can be used to measure the temperature of a single location on the workpiece. The use of a single temperature probe is desirable, for instance, when measuring the temperature of substantially similar workpieces, such as meat patties that are of uniform thickness. In this instance, temperature modeling may or may not be used, since the variation between workpieces is substantially negated. The expected temperatures for each of these uniformly shaped workpieces will be substantially the same, and thus, math modeling may or may not be desired.

In another embodiment, a temperature probe may be attached to a device that allows insertion only halfway into a workpiece. Such device is described in U.S. Pat. No. 4,580,909, which is herein fully incorporated by reference.

9. Predictive Modeling

In another aspect of the present invention, predictive modeling can be used additionally or alternatively as a supplement to feedback temperature control. Based on any number of parameters, such as the location of the temperature sensor on the workpiece, the size of the workpiece, or the thickness of the workpiece, thermal conductivities and specific heat capacities, future populations of the workpieces can be predicted to undergo a specific temperature within the heat engine, and thus, the temperature of the heat engine, or the conveyor speed can be adjusted accordingly in a feed forward control mode. Such modeling is described in U.S. application Ser. No. 09/560,637, the disclosure of which is herein fully incorporated by reference.

In one embodiment, a plurality of temperature values can be obtained by using multiple temperature probes. A processor can use one of the high temperature, low temperature, or average of the temperatures as an input value to a controller. Such controller can then adjust the temperature of the heat engine, and additionally or alternatively, the conveyor speed. Modeling of expected temperature-time profiles within a heat engine is desirable, for example, when processing irregularly sized workpieces, since the time interval that can occur between the measurement of workpieces can extend into several minutes. Accordingly, the math model predicts the appropriate control parameter during this delay period. In this manner, variations are reduced. The input signals to one or more controllers is likewise made more reliable. The introduction of large errors between the measured variable and the setpoint are avoided. The modeling module can supplement or otherwise replace the actual input temperature to the controller to achieve the temperature control. In another aspect of the invention, modeling can take on the role of backup to the temperature-sensing device. Math modeling can guard against wide fluctuations in adjustments so as to produce a more consistent product, as well as ensure that all the workpieces achieve the desired minimum temperature.

10. Scanning Stations

The scanning stations 232 or 346, whereat workpieces are scanned, ascertain selected physical parameters, for example, their size and shape, including thickness. Information from the scanning structures is used to control certain pick-up tools, temperature probes or conveyors. In addition, it is possible to locate discontinuities (including voids), foreign material, and undesirable material in the workpiece, for example, bones or fat in a meat portion, and thus avoid them while probing. The scanning can be carried out utilizing a variety of techniques, including a video camera to view a workpiece illuminated by one or more light sources. Light from the light source is extended across the moving conveyor to define a sharp shadow or light stripe line, with the area forwardly of the transverse beam being dark. When no workpiece is being carried by the conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor. This displacement represents the thickness of the workpiece along the shadow line/light stripe. The length of the workpiece is determined by the length of time that shadow lines are created by the workpiece. In this regard, an encoder is integrated into the scan structures, with the encoder generating pulses at fixed time intervals corresponding to the forward movement of the conveyor.

In lieu of a video camera, the scanning stations may instead utilize a x-ray apparatus for determining the physical characteristics of the workpiece, including its shape, mass and weight. X-rays may be passed through the object in the direction of a x-ray detector. Such x-rays are attenuated by the workpiece in proportion to the mass thereof. The x-ray detector is capable of measuring the intensity of x-rays received thereby after passing through the workpiece. This information is utilized to determine the overall shape and size of the workpiece, as well as the mass thereof. An example of such a x-ray scanning device is disclosed by U.S. Pat. No. 5,585,603, incorporated by reference herein.

The data information measured/gathered by the scanning devices is transmitted to a computer, which records the location of the workpiece on the conveyor as well as the shape and other parameters of the workpiece. With this information, the computer determines whether there is any overlapping of workpieces, and additionally, or alternatively, selects the largest workpiece and keeps track of its location so the pick-up tool may retrieve the workpiece so that the probe is correctly placed for temperature measurement.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for measuring the temperature of workpieces transported on a conveyor, comprising:
   a translatable assembly having a pick-up tool configured to actuate in a repetitive motion for picking up a workpiece and having a holding and releasing action, and;
   a temperature-sensing device in proximity to the pick-up tool configured to measure the temperature of the workpiece during the holding action.

2. The apparatus of claim 1, wherein the temperature-sensing device further comprises multiple probes for sensing temperatures on multiple workpiece locations.

3. The apparatus of claim 1, wherein the temperature-sensing device includes a single probe for sensing temperature at one location.

4. The apparatus of claim 1, wherein the pick-up tool has a source of vacuum for creating the holding action which holds the workpiece to the pick-up tool.

5. The apparatus of claim 1, wherein the translatable assembly further comprises:
   a first carriage mounted on a first support structure, said carriage having the pick-up tool and the temperature-sensing device mounted thereon, and said first carriage configured to translate in a first direction.

6. The apparatus of claim 5, wherein the translatable assembly further comprises:
   a second carriage mounted on a second support structure, said second carriage supporting the first support structure, and said second carriage translatable in a second direction.

7. The apparatus of claim 1, wherein the temperature-sensing device further comprises a transmitter with signal communication to a conveyor speed controller.

8. The apparatus of claim 1, wherein the temperature-sensing device further comprises a transmitter with signal communication to a heat engine temperature controller.

9. The apparatus of claim 1, wherein the temperature-sensing device further comprises a transmitter with signal communication to a recorder.

10. The system of claim 1:
wherein the temperature-sensing device being mounted on the translatable assembly;
wherein the translatable assembly is configured to actuate towards a workpiece to place the temperature-sensing device at a temperature-sensing and to travel in the direction of the workpiece for a suitable time.

11. The apparatus of claim 10, wherein the temperature-sensing device further comprises multiple probes for sensing temperatures on multiple workpiece locations.

12. The apparatus of claim 10, wherein the temperature-sensing device includes a single probe for sensing temperature at one location.

13. The apparatus of claim 10, wherein the translatable assembly further comprises:
a first carriage mounted on a first support structure, said carriage having the temperature-sensing device mounted thereon, and said first carriage configured to translate in first direction.

14. The apparatus of claim 13, wherein the translatable assembly further comprising:
a second carriage mounted on a second support structure, said carriage supporting the first support structure, and said second carriage translatable in a second direction.

15. The apparatus of claim 10, wherein the temperature-sensing device further comprises a transmitter with signal communication to a convey speed control.

16. The apparatus of claim 10, wherein the temperature-sensing device further comprises a transmitter with signal communication to a heat engine temperature controller.

17. The apparatus of claim 10, wherein the temperature-sensing device further comprises a transmitter with signal communication to a recorder.

18. The apparatus according to claim 1, further comprising:
a scanner for scanning the workpieces being transported on the conveyor to ascertain overlapping workpieces; and
a separator using the information from the scanner to separate the overlapping workpieces.

19. The apparatus of claim 1:
further comprising a scanner to scan the workpieces to determine the largest of the workpieces in a population; and
the translatable assembly being controllable to automatically pick up the largest workpieces from the scanned population.

20. A system for measuring the temperature of workpieces, comprising:
a conveyor for transporting workpieces;
a heat engine in proximity to the conveyor for processing the workpieces;
a translatable assembly having a pick-up tool configured to actuate in a repetitive motion for picking up a workpiece and having a holding and releasing action, and a temperature-sensing device in proximity to the pick-up tool configured to measure the temperature of the workpiece during the holding action, the assembly located in proximity to the conveyor, the heat engine ahead of the assembly.

21. The system of claim 20, wherein the temperature-sensing device further comprises multiple probes for sensing temperatures on multiple workpiece locations.

22. The system of claim 20, wherein the temperature-sensing device includes a single probe for sensing temperature at one location.

23. The system of claim 20, wherein the pick-up tool has a source of vacuum for creating the holding action which holds the workpiece to the pick-up tool.

24. The system of claim 20, wherein the translatable assembly further comprises:
a first carriage mounted on a first support structure, said carriage having the pick-up tool and the temperature-sensing device mounted thereon, and said first carriage configured to translate in a first direction.

25. The system of claim 24, wherein the translatable assembly further comprises:
a second carriage mounted on a second support structure, said second carriage supporting the first support structure, and said second carriage translatable in a second direction.

26. The system of claim 20, wherein the temperature-sensing device further comprises a transmitter with signal communication to a conveyor speed controller.

27. The system of claim 20, wherein the temperature-sensing device further comprises a transmitter with signal communication to a heat engine temperature controller.

28. The system of claim 20, wherein the temperature-sensing device further comprises a transmitter with signal communication to a recorder.

29. The system of claim 20, wherein the heat engine is one of a freezer, oven, and fryer.

30. An apparatus for measuring the temperature of workpieces transported on a conveyor, comprising:
a translatable assembly having a pick-up tool configured to actuate in a repetitive motion for picking up a workpiece and having a holding and releasing action, and a temperature-sensing device in proximity to the pick-up tool configured to measure the temperature of the workpiece during the holding action; and
a scan structure with signal communication to the assembly for positioning of the assembly relative to the conveyor, the scan structure located ahead of the assembly.

31. The apparatus of claim 30, wherein the temperature-sensing device further comprises multiple probes for sensing temperatures on multiple workpiece locations.

32. The apparatus of claim 30, wherein the temperature-sensing device includes a single probe for sensing temperature at a single location.

33. The apparatus of claim 30, wherein the pick-up tool has a source of vacuum for creating the holding action which holds the workpiece to the pick-up tool.

34. The apparatus of claim 30, wherein the translatable assembly further comprises:
a first carriage mounted on a first support structure, said carriage having the pick-up tool and the temperature-sensing device mounted thereon, and said first carriage configured to translate in a first direction.

35. The apparatus of claim 34, wherein the translatable assembly further comprises:
a second carriage mounted on a second support structure, said second carriage supporting the first support structure, and said second carriage translatable in a second direction.

36. The apparatus of claim 30 wherein the temperature-sensing device further comprises a transmitter with signal communication to a conveyor speed controller.

37. The apparatus of claim 30, wherein the temperature-sensing device further comprises a transmitter with signal communication to a heat engine temperature controller.

38. The apparatus of claim 30, wherein the temperature-sensing device further comprises a transmitter with signal communication to a recorder.

39. The apparatus of claim 30, wherein:
the scan structure is capable of scanning the workpieces to determine whether said workpieces are overlapping each other; and
further comprising a separating structure to separate the overlapping workpieces from each other.

40. The apparatus of claim 30, wherein;
the scanning structure capable of scanning a population of workpieces to determine the largest of the workpieces in the population; and
the translatable assembly being controllable to pick up the largest workpiece to determine by the scanned structure.

41. A system for measuring the temperature of workpieces, comprising:
a conveyor for transporting workpieces;
a heat engine in proximity to the conveyor for processing the workpieces;
a translatable assembly having a pick-up tool configured to actuate in a repetitive motion for picking up a workpiece and having a holding and releasing action, and a temperature-sensing device in proximity to the pick-up tool configured to measure the temperature of the workpiece during the holding action, the assembly located in proximity to the conveyor, the heat engine ahead of the assembly; and
a scan structure with signal communication to the assembly for positioning of the assembly relative to the conveyor, the scan structure located in proximity to the conveyor and ahead of the assembly.

42. The system of claim 41, wherein the temperature-sensing device further comprises multiple probes for sensing temperatures on multiple workpiece locations.

43. The system of claim 41, wherein the temperature-sensing device includes a single probe for sensing temperature at a single location.

44. The system of claim 41, wherein the pick-up tool has a source of vacuum for creating the holding action which holds the workpiece to the pick-up tool.

45. The system of claim 41, wherein the translatable assembly further comprises:
a first carriage mounted on a first support structure, said carriage having the pick-up tool and the temperature-sensing device mounted thereon, and said first carriage configured to translate in a first direction.

46. The apparatus of claim 45, wherein the translatable assembly further comprises:
a second carriage mounted on a second support structure, said second carriage supporting the first support structure, and said second carriage translatable in a second direction.

47. The system of claim 45, wherein the temperature-sensing device further comprises a transmitter with signal communication to a conveyor speed controller.

48. The system of claim 45, wherein the temperature-sensing device further comprises a transmitter with signal communication to a heat engine temperature controller.

49. The system of claim 45, wherein the temperature-sensing device further comprises a transmitter with signal communication to a recorder.

50. The system of claim 45, wherein the heat engine is one of a freezer, oven, and fryer.

51. The system of claim 41, wherein:
the scan structure is capable of scanning the workpieces to determine whether said workpieces are overlapping each other; and
further comprising a separating structure to separate the overlapping workpieces from each other.

52. The system of claim 41;
the scanning structure capable of scanning a population of workpieces to determine the largest of the workpieces in the population; and
the translatable assembly being controllable to pick up the largest workpiece scanned by the scanned structure.

53. A system for measuring the temperature of workpieces, comprising:
a conveyor for transporting workpieces;
a heat engine in proximity to the conveyor for processing workpieces;
a translatable assembly having a pick-up tool configured to actuate in a repetitive motion for picking up a workpiece and having a holding and releasing action, and a temperature-sensing device in proximity to the pick-up tool configured to measure the temperature of the workpiece during the holding action, the assembly located in proximity to the conveyor, the heat engine ahead of the assembly; and
a scan structure with signal communication to a conveyor speed controller, the scan structure located in proximity to the conveyor and ahead of the heat engine.

54. The system of claim 53, wherein the temperature-sensing device further comprises multiple probes for sensing temperatures on multiple workpiece locations.

55. The system of claim 53, wherein the temperature-sensing device includes a single probe for sensing temperature at a single location.

56. The system of claim 53, wherein the pick-up tool has a source of vacuum for creating the holding action which holds the workpiece to the pick-up tool.

57. The system of claim 53, wherein the translatable assembly further comprises:
a first carriage mounted on a first support structure, said carriage having the pick-up tool and the temperature-sensing device mounted thereon, and said first carriage configured to translate in a first direction.

58. The system of claim 57, wherein the translatable assembly further comprises:
a second carriage mounted on a second support structure, said second carriage supporting the first support structure and said second carriage translatable in a second direction.

59. The system of claim 53, wherein the temperature-sensing device further comprises a transmitter with signal communication to a heat engine temperature controller.

60. The system of claim 53, wherein the temperature-sensing device further comprises a transmitter with signal communication to a recorder.

61. The system of claim 53, further comprising a second conveyor having a speed controller with signal communication to the temperature-sensing device.

62. The system of claim 53, wherein the heat engine is one of a freezer, oven, and fryer.

63. The system of claim 53, wherein:
the scan structure is capable of scanning the workpieces to determine whether said workpieces are overlapping each other; and
further comprising a separating structure to separate the overlapping workpieces from each other.

64. The system of claim 53;
the scanning structure capable of scanning a population of workpieces to determine the largest of the workpieces in the population; and the translatable assembly being controllable to picking up the largest workpiece scanned by the scan structure.

65. A method for measuring the temperature of workpieces after a heat engine and being transported on a conveyor, comprising automatically picking up a workpiece from the conveyor and measuring the temperature of the workpiece while the workpiece is automatically picked up from the conveyor.

66. The method of claim 65, further comprising adjusting the temperature of a heat engine to control the temperature of the workpieces.

67. The method of claim 65, further comprising adjusting the speed of a conveyor to control the temperature of the workpieces.

68. The method of claim 65, further comprising measuring the temperature of a plurality of locations on the workpiece.

69. The method of claim 68, further comprising taking the high, low and the average of the temperatures from the measurements and using at least one of the high, low and average values as input to a controller.

70. The method of claim 68, further comprising measuring the temperature of an irregularly shaped workpiece.

71. The method of claim 65, further comprising measuring the temperature at a single location on the workpiece.

72. The method of claim 71, further comprising measuring the temperature of a workpiece having a substantially constant thickness.

73. The method of claim 65, further comprising:

scanning a population of workpieces to determine whether any of the workpieces are overlapping each other; and separating the overlapping workpieces.

74. The method of claim 65, further comprising:

scanning a population of workpieces to determine the largest of the workpieces in the population; and automatically picking up the largest of the workpieces from the population scanned and measuring the temperature of said largest of the workpieces.

* * * * *

UNITED STATES PATENT AND TRADEMARK OFFICE
CERTIFICATE OF CORRECTION

PATENT NO. : 6,866,417 B2  Page 1 of 4
APPLICATION NO. : 10/213356
DATED : March 15, 2005
INVENTOR(S) : R. Gunawardena et al.

It is certified that error appears in the above-identified patent and that said Letters Patent is hereby corrected as shown below:

| COLUMN | LINE | ERROR |
|---|---|---|
| On Title Page, Item-(73) Pg. 1, col. 1 | Assignee's address | "Sandusky, OH (US)"" should read --Houston, TX (US)-- |
| 1 | 21 | "guidelines, however," should read --guidelines; however,-- |
| 1 | 61 | "addressed with" should read --addressed by the-- |
| 2 | 65 | "invention; and" should read --invention;-- |
| 3 | 28 | "302, operable" should read --302 operable-- |
| 3 | 37 | "320, picks" should read --320 picks-- |
| 3 | 39 | "318, is" should read --318 is-- |
| 3 | 42 | "the * speed" should read --the speed-- |
| 4 | 35 | "parameter." Should read --parameters.-- |
| 4 | 43 | "Workpieces" should read --"Workpieces"-- |
| 4 | 62 | "102, can" should read --102 can-- |
| 6 | 41 | "the," should read --the-- |
| 7 | 37 | "bidirectional" should read --bi-directional-- |
| 7 | 59 | "may, be" should read --may be-- |
| 8 | 20 | "hardware, and" should read --hardware and-- |
| 8 | 27 | "temperature, controller" should read --temperature controller-- |
| 8 | 59 | "used to, determine" should read --used to determine-- |
| 8 | 67 | "tool 320," should read --tool 320-- |

UNITED STATES PATENT AND TRADEMARK OFFICE
CERTIFICATE OF CORRECTION

PATENT NO. : 6,866,417 B2
APPLICATION NO. : 10/213356
DATED : March 15, 2005
INVENTOR(S) : R. Gunawardena et al.

It is certified that error appears in the above-identified patent and that said Letters Patent is hereby corrected as shown below:

| COLUMN | LINE | ERROR |
| --- | --- | --- |
| 9 | 1-2 | "As with the previous" should read --Like the previous-- |
| 9 | 24 | "bidirectional" should read --bi-directional-- |
| 10 | 66 | "316, of " should read --316 of-- |
| 11 | 13 | "500 is" should read --500 are-- |
| 11 | 41 | "and carried" should read --and is carried-- |
| 12 | 11 | "complicated-routes" should read --complicated routes-- |
| 12 | 14 | "FIG. 4, may" should read --FIG. 4 may-- |
| 12 | 25 | "11, is" should read --11 is-- |
| 12 | 29 | "on to" should read --onto-- |
| 12 | 57 | "of conveyor." should read --of the conveyor.-- |
| 13 | 39 | "FIG. 4 do" should read --FIG. 4, do-- |
| 14 | 17 | "but can" should read --but the pick-up tool can-- |
| 14 | 54 | "from conveyor." should read --from the conveyor.-- |
| 14 | 61 | "bottom-of" should read --bottom of-- |
| 15 | 10 | "554. that" should read --554 that-- |
| 15 | 17 | "pick up, a" should read --pick up a-- |
| 16 | 63 | "Such device" should read --Such a device-- |
| 17 | 25 | "controllers is" should read --controllers are-- |
| 18 | 2 | "a x-ray" should read --an x-ray-- |

UNITED STATES PATENT AND TRADEMARK OFFICE
CERTIFICATE OF CORRECTION

PATENT NO.       : 6,866,417 B2
APPLICATION NO.  : 10/213356
DATED            : March 15, 2005
INVENTOR(S)      : R. Gunawardena et al.

It is certified that error appears in the above-identified patent and that said Letters Patent is hereby corrected as shown below:

| COLUMN | LINE | ERROR |
|---|---|---|
| 18 | 5 | "a x-ray" should read --an x-ray-- |
| 18 | 11 | "a x-ray" should read --an x-ray-- |
| 18 (Claim 1) | 33 | "action," should read --action;-- |
| 18 (Claim 1) | 34 | "and;" should read --and-- |
| 19 (Claim 10) | 1 | "The system" should read --The apparatus-- |
| 19 (Claim 10) | 3 | "assembly;" should read --assembly; and-- |
| 19 (Claim 13) | 19 | "in first direction." should read --in a first direction.-- |
| 19 (Claim 14) | 21 | "comprising:" should read --comprises:-- |
| 19 (Claim 15) | 27 | "control." should read --controller.-- |
| 19 (Claim 19) | 47 | "workpieces" should read --workpiece-- |
| 19 (Claim 20) | 53 | "workpieces;" should read --workpieces; and-- |
| 20 (Claim 36) | 59 | "claim 30" should read --claim 30,-- |
| 21 (Claim 40) | 7 | "wherein;" should read --wherein:-- |

UNITED STATES PATENT AND TRADEMARK OFFICE
CERTIFICATE OF CORRECTION

PATENT NO. : 6,866,417 B2
APPLICATION NO. : 10/213356
DATED : March 15, 2005
INVENTOR(S) : R. Gunawardena et al.

It is certified that error appears in the above-identified patent and that said Letters Patent is hereby corrected as shown below:

| COLUMN | LINE | ERROR |
|---|---|---|
| 21 (Claim 40) | 12 | "workpiece to determine" should read --workpiece is scanned-- |
| 21 (Claim 46) | 47 | "The apparatus" should read --The system-- |
| 22 (Claim 52) | 3 | "claim 41;" should read --claim 41, wherein:-- |
| 22 (Claim 64) | 64 | "claim 53;" should read --claim 53, wherein:-- |
| 23 (Claim 64) | 1 | "to picking up" should read --to pick up-- |

Signed and Sealed this

Twenty-sixth Day of December, 2006

JON W. DUDAS
*Director of the United States Patent and Trademark Office*